(12) United States Patent
Wakai

(10) Patent No.: US 11,727,236 B2
(45) Date of Patent: Aug. 15, 2023

(54) IMAGE FORMING SYSTEM, CONTROL METHOD THEREOF, AND MEDIUM

(71) Applicant: CANON KABUSHIKI KAISHA, Tokyo (JP)

(72) Inventor: Kazuo Wakai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/568,095

(22) Filed: Jan. 4, 2022

(65) Prior Publication Data

US 2022/0222499 A1     Jul. 14, 2022

(30) Foreign Application Priority Data

Jan. 8, 2021    (JP) ................................. 2021-002391

(51) Int. Cl.
    *G06K 15/00*       (2006.01)
    *G06K 15/02*       (2006.01)

(52) U.S. Cl.
    CPC ......... *G06K 15/408* (2013.01); *G06K 15/027* (2013.01); *G06K 15/403* (2013.01)

(58) Field of Classification Search
    CPC .................................................. G06K 15/408

USPC .......................................................... 358/1.14

See application file for complete search history.

(56) References Cited

U.S. PATENT DOCUMENTS

| | | | | |
|---|---|---|---|---|
| 2010/0097624 A1* | 4/2010 | Hirakawa | ............ | G06K 15/027 358/1.18 |
| 2011/0129239 A1* | 6/2011 | Kubota | ................ | G03G 15/655 399/16 |
| 2020/0051231 A1* | 2/2020 | Tsukamoto | ........... | G06T 7/0002 |
| 2020/0234421 A1* | 7/2020 | Kaminaka | ............. | G06F 3/1204 |

FOREIGN PATENT DOCUMENTS

JP            2020116746 A       8/2020

* cited by examiner

*Primary Examiner* — Jacky X Zheng

(74) *Attorney, Agent, or Firm* — Rossi, Kimms & McDowell LLP

(57) ABSTRACT

An image forming system is provided. The image forming system comprises an image forming unit configured to execute a print job and form an image on a supplied sheet; and an inspection unit configured to inspect quality of the image formed in the sheet, wherein the inspection unit does not set a sheet discharged by the image forming unit without being used for the print job to a target of inspection.

13 Claims, 15 Drawing Sheets

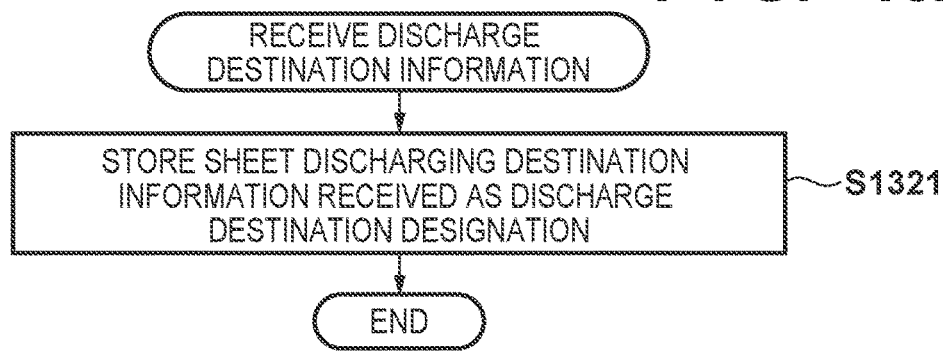
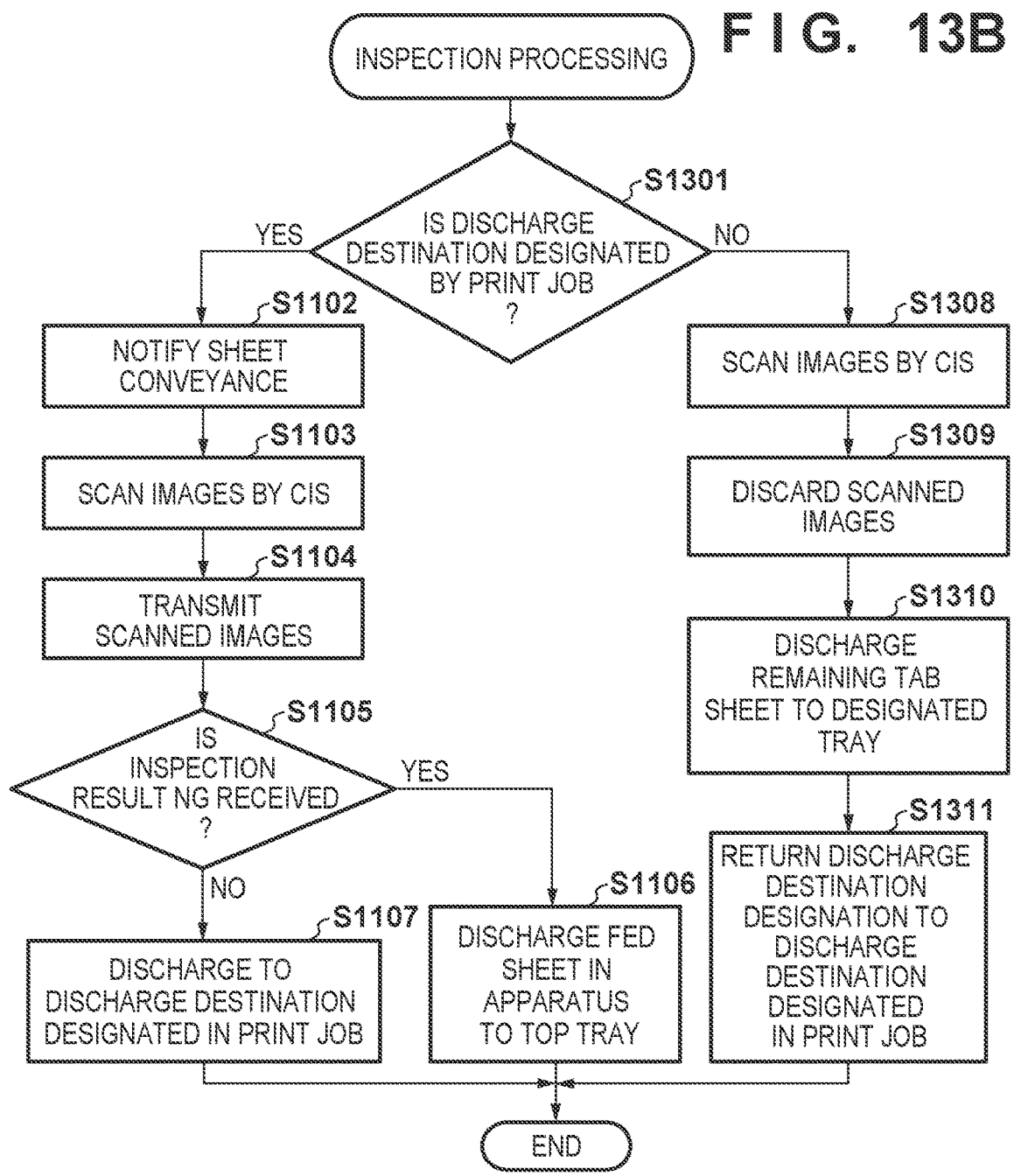

IMAGE FORMING SYSTEM, CONTROL METHOD THEREOF, AND MEDIUM

BACKGROUND OF THE INVENTION

Field of the Invention

The present invention relates to an image forming system, a control method thereof, and a medium.

Description of the Related Art

There is known an inspection apparatus that reads a printed product printed by a printing apparatus (image forming apparatus) and inspects quality. The inspection apparatus can detect an image defect such as dirt or omission of printing, a character error, barcode quality, and the like. A product in which these defects are detected can be discriminated from a printed product free from defects by, for example, changing the discharge destination. To do inspection by the inspection apparatus, a reference image serving as the reference of a printed product free from defects needs to be registered in advance.

Also, for a product using cyclic paper sheets such as tab (index) paper sheets, the printing apparatus has a function (remaining tab discharge function) of forcibly discharging remaining sheets (remaining tabs). If the remaining tabs are discharged, sheets without reference image registration are added as inspection targets. Mismatching with the order of reference images expected by the inspection apparatus occurs, and the inspection results of the remaining tab sheets become NG (defective). To avoid the inspection result NG by remaining tab discharge, in a conventional technique, a technique of excluding all tab sheets from the inspection target is disclosed (Japanese Patent Laid-Open No. 2020-116746).

However, even if the tab sheets should be included in the inspection target, all tab sheets are excluded from the inspection target in the conventional technique.

SUMMARY OF THE INVENTION

The present invention sets a cyclic sheet used in a printed product to an inspection target and simultaneously excludes a cyclic sheet to be discharged without being used from the inspection target.

The present invention has the following configuration. According to one aspect of the invention, provided is an image forming system comprising: an image forming unit configured to execute a print job and form an image on a supplied sheet; and an inspection unit configured to inspect quality of the image formed in the sheet, wherein the inspection unit does not set a sheet discharged by the image forming unit without being used for the print job to a target of inspection According to the present invention, it is possible to set a cyclic sheet used in a printed product to an inspection target and simultaneously exclude a cyclic sheet to be discharged without being used from the inspection target.

Further features of the present invention will become apparent from the following description of exemplary embodiments with reference to the attached drawings.

BRIEF DESCRIPTION OF THE DRAWINGS

FIGS. 13A and 13B are flowcharts showing the basic operation of an inspection unit according to the second embodiment.

DESCRIPTION OF THE EMBODIMENTS

Figure 1:
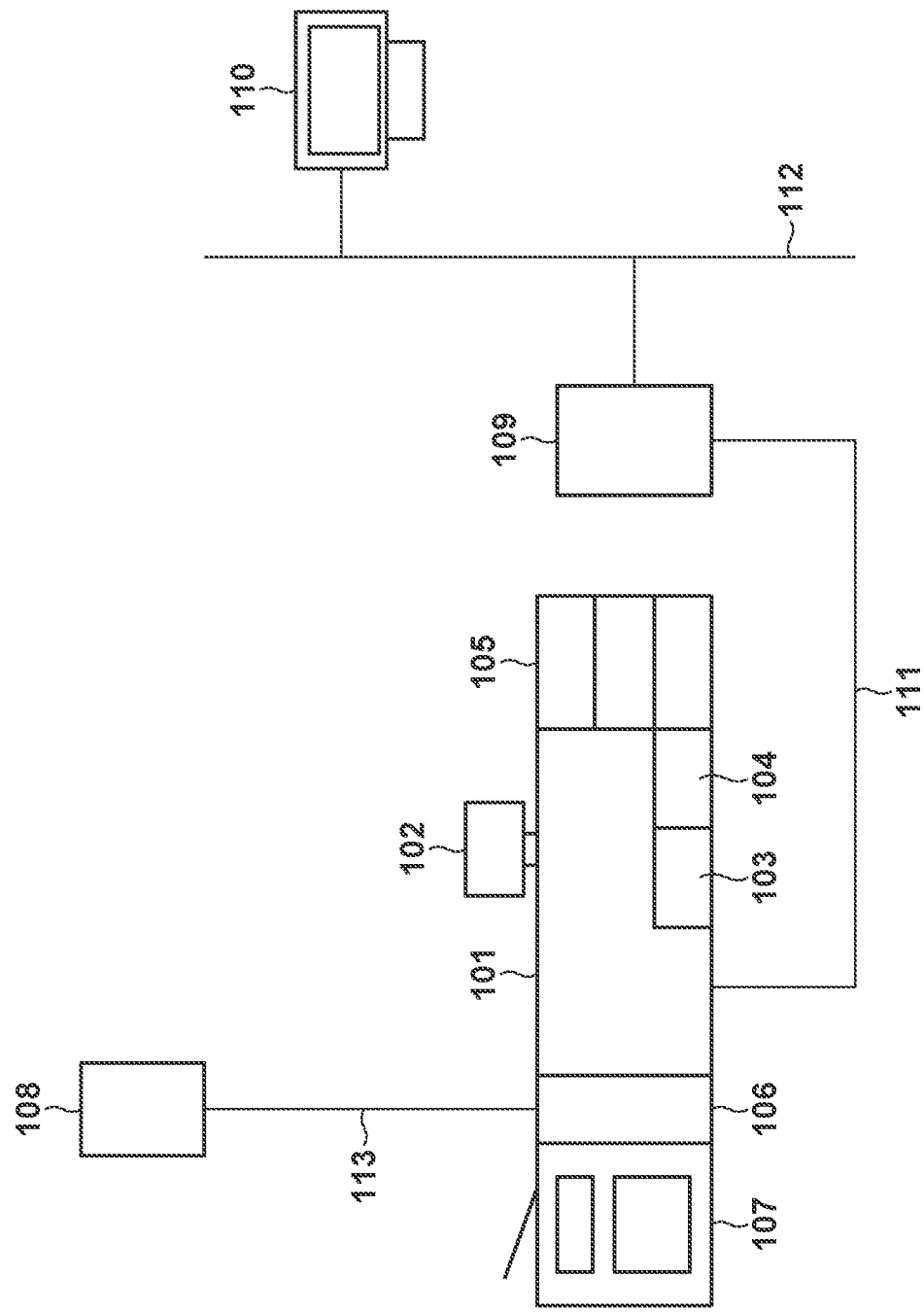
FIG. 1 is a schematic view showing the configuration of an information processing apparatus, an inspection apparatus, and a printing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Image Forming System

FIG. 1 is a schematic view showing the configuration of an image forming system (or a printing system) including an information processing apparatus, an inspection apparatus, and a printing apparatus (also called an image forming apparatus) according to this embodiment. Note that the printing apparatus according to this embodiment will be described using an electrophotographic type printing apparatus. However, the printing apparatus according to this embodiment may be a printing apparatus of another image forming type such as an inkjet type or an offset type.

A printing apparatus 101 is connected to an information processing apparatus 109 via a cable 111. The information processing apparatus 109 is connected to a client computer 110 via a network 112. The information processing apparatus 109 may be further connected to an inspection apparatus 108.

The printing apparatus 101 includes a UI panel 102, a paper feed deck 103, and a paper feed deck 104. Also, an optional deck 105 including three stages of paper feed decks is connected. The printing apparatus 101 is, for example, an electrophotographic type printing apparatus. In addition, the UI panel 102 is a user interface including, for example, an electrostatic capacitance type touch panel.

Furthermore, the printing apparatus 101 includes an inspection unit 106 and a large capacity stacker 107. The inspection unit is connected to the inspection apparatus 108 via a cable 113. The large capacity stacker 107 includes a plurality of different stacking portions, for example, a main tray and a top tray, which are configured to place sheets discharged from the inspection unit 106. Several thousand paper sheets can be stacked on the main tray at once. The large capacity stacker 107 can switch the discharge destination to one of the main tray and the top tray in accordance with an instruction from the printing apparatus 101 or the inspection apparatus 108. The sheets are placed on the switched tray while being sequentially overlaid. Here, paper sheets are exemplified, but the sheet material is not limited to paper.

A print job is generated by the client computer 110, transmitted to the information processing apparatus 109 via the network 112, and managed by the information processing apparatus 109. The print job is then transmitted from the information processing apparatus 109 to the printing apparatus 101 via the cable 111, and the printing apparatus 101 performs processing of forming an image on a paper sheet.

Note that the client computer 110, the information processing apparatus 109, and the inspection apparatus 108 may be connected to the cable 111 so as to be communicable with the printing apparatus 101.

Figure 2:
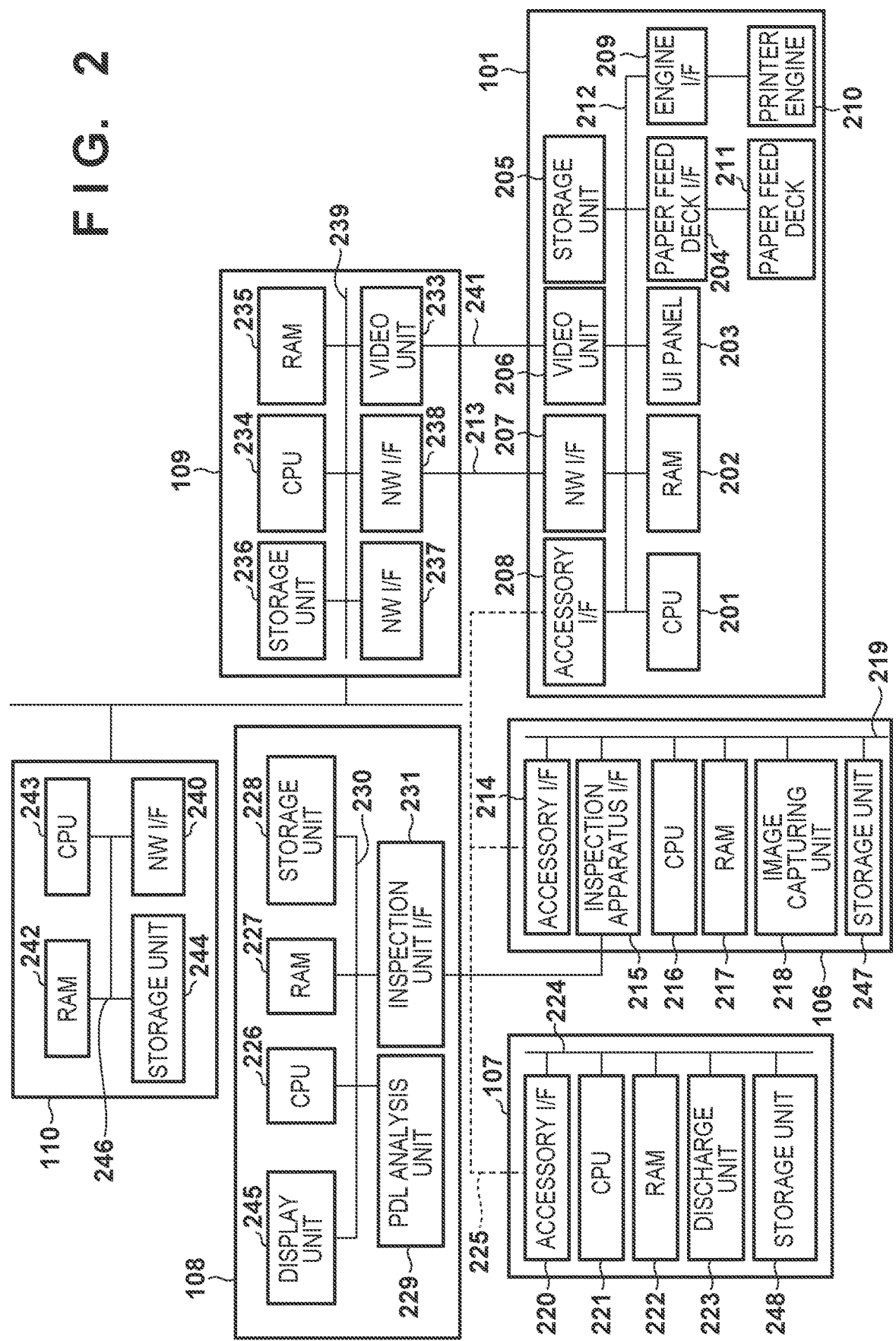
FIG. 2 is a block diagram showing the configuration of the information processing apparatus, the inspection apparatus, and the printing apparatus according to the embodiment.

FIG. 2 is a block diagram showing the control configuration of the printing apparatus 101, the inspection unit 106, the inspection apparatus 108, the large capacity stacker 107, the information processing apparatus 109, and the client computer 110 according to this embodiment.

Image Forming Apparatus (Printing Apparatus) 101

A CPU (Central Processing Unit) 201 conducts control and operations of units in the printing apparatus 101 via a system bus 212. The CPU 201 conducts execution of programs stored in a storage unit 205 and loaded into a RAM (Random Access Memory) 202. The RAM 202 is a kind of general volatile storage device that the CPU 201 can directly access, and is used as the work area of the CPU 201 or another temporary data storage area. The storage unit 205 functions as a temporary storage area and a work memory when the printing apparatus operates.

An engine I/F 209 conducts communication with a printer engine 210 and control thereof. A paper feed deck I/F 204 conducts communication with a paper feed deck 211 and control thereof. The paper feed deck 211 is the general term of hardware configurations for the paper feed decks 103 and 104 and the optional deck 105. A UI panel 203 is the hardware configuration of the UI panel 102, and is a user interface configured to perform the general operation of the printing apparatus 101. In this embodiment, the UI panel 203 includes an electrostatic capacitance type touch panel.

A network interface (to be referred to as an NW I/F hereinafter) 207 is connected to an NW I/F 238 of the information processing apparatus 109 via a cable 213, and conducts communication between the information processing apparatus 109 and the printing apparatus 101. Note that in this example, interfaces connected to the system buses 212 and 239 are directly connected to each other. The information processing apparatus 109 and the printing apparatus 101 may be connected via, for example, a network, and the connection method is not limited. A video I/F 206 is connected to a video I/F 233 via a video cable 241, and conducts communication of image data between the information processing apparatus 109 and the printing apparatus 101.

Note that the connection interface of the information processing apparatus 109 to the printing apparatus 101 may integrate the functions of the NW I/F 238 and the video I/F 233. In addition, the connection interface of the printing apparatus 101 to the information processing apparatus 109 may integrate the functions of the NW I/F 207 and the video I/F 206.

An accessory I/F 208 is connected to an accessory I/F 214 and an accessory I/F 220 via a cable 225. That is, the printing apparatus 101 communicates with the inspection unit 106 and the large capacity stacker 107 via the accessory I/Fs 208, 214, and 220.

Inspection Unit 106

A CPU 216 conducts control and operations of units in the inspection unit 106 via a system bus 219. The CPU 216 conducts execution of programs stored in a storage unit 247 and loaded into a RAM 217. The RAM 217 is a kind of general volatile storage device that the CPU 216 can directly access, and is used as the work area of the CPU 216 or another temporary data storage area.

The storage unit 247 functions as a temporary storage area and a work memory when the inspection apparatus operates. An inspection apparatus I/F 215 is connected to an inspection unit I/F 231 via a cable. That is, the inspection unit 106 communicates with the inspection apparatus 108 via the inspection apparatus I/F 215 and the inspection unit I/F 231.

An image capturing unit 218 has an image capturing function with, for example, a contact image sensor (to be referred to as a CIS hereinafter), captures a paper sheet passing through the inspection unit, and transmits the captured image to the inspection apparatus 108 via the inspection apparatus I/F 215. Note that the CIS of the image capturing unit 218 is an example of a sensor, a sensor of another type such as a CCD image sensor may be used, and the image capturing method thereof is not limited.

Large Capacity Stacker 107

A CPU 221 conducts control and operations of units in the large capacity stacker 107 via a system bus 224. The CPU 221 conducts execution of programs stored in a storage unit 248 and loaded into a RAM 222. The RAM 222 is a kind of general volatile storage device that the CPU 221 can directly access, and is used as the work area of the CPU 221 or another temporary data storage area. The storage unit 248 functions as a temporary storage area and a work memory when the inspection apparatus operates. A discharge unit 223 conducts a discharge operation to the main tray and the top tray and monitoring and control of the stacking state on each of the main tray and the top tray.

Inspection Apparatus 108

A CPU 226 conducts control and operations of units in the inspection apparatus 108 via a system bus 230. The CPU 226 conducts execution of programs stored in a storage unit 228 and loaded into a RAM 227. The RAM 227 is a kind of general volatile storage device that the CPU 226 can directly access, and is used as the work area of the CPU 226 or another temporary data storage area. The storage unit 228 functions as a temporary storage area and a work memory when the inspection apparatus operates.

A PDL analysis unit 229 loads PDL data such as PDF, PostScript®, and PCL received from the client computer 110 or the information processing apparatus 109, and executes interpretation processing. A display unit 245 is, for example, a liquid crystal display connected to the inspection apparatus, and accepts a user input to the inspection apparatus or displays the state of the inspection apparatus. The inspection unit I/F 231 is a user interface configured to communicate with the inspection apparatus 108.

Information Processing Apparatus 109

A CPU 234 conducts control and operations of units in the information processing apparatus 109 via the system bus 239. The CPU 234 conducts execution of programs stored in a storage unit 236 and loaded into a RAM 235. The RAM 235 is a kind of general volatile storage device that the CPU 234 can directly access, and is used as the work area of the CPU 234 or another temporary data storage area. The storage unit 236 functions as a temporary storage area and a work memory when the information processing apparatus operates. A network interface (to be referred to as an NW I/F hereinafter) 237 is connected to NW I/Fs 232 and 240 via a network. The information processing apparatus 109 communicates with the inspection apparatus 108 via the NW I/F 237 and the NW I/F 232. Also, the information processing apparatus 109 communicates with the client computer 110 via the NW I/F 237 and the NW I/F 240.

Client Computer 110

A CPU 243 conducts control and operations of units in the client computer 110 via a system bus 246. The CPU 243 conducts execution of programs stored in a storage unit 244 and loaded into a RAM 242. The RAM 242 is a kind of general volatile storage device that the CPU 243 can directly access, and is used as the work area of the CPU 243 or another temporary data storage area. The storage unit 244 functions as a temporary storage area and a work memory when the client computer operates. The client computer 110 is connected to the information processing apparatus 109 via the network interface 240.

Printing Mechanism

Figure 3:
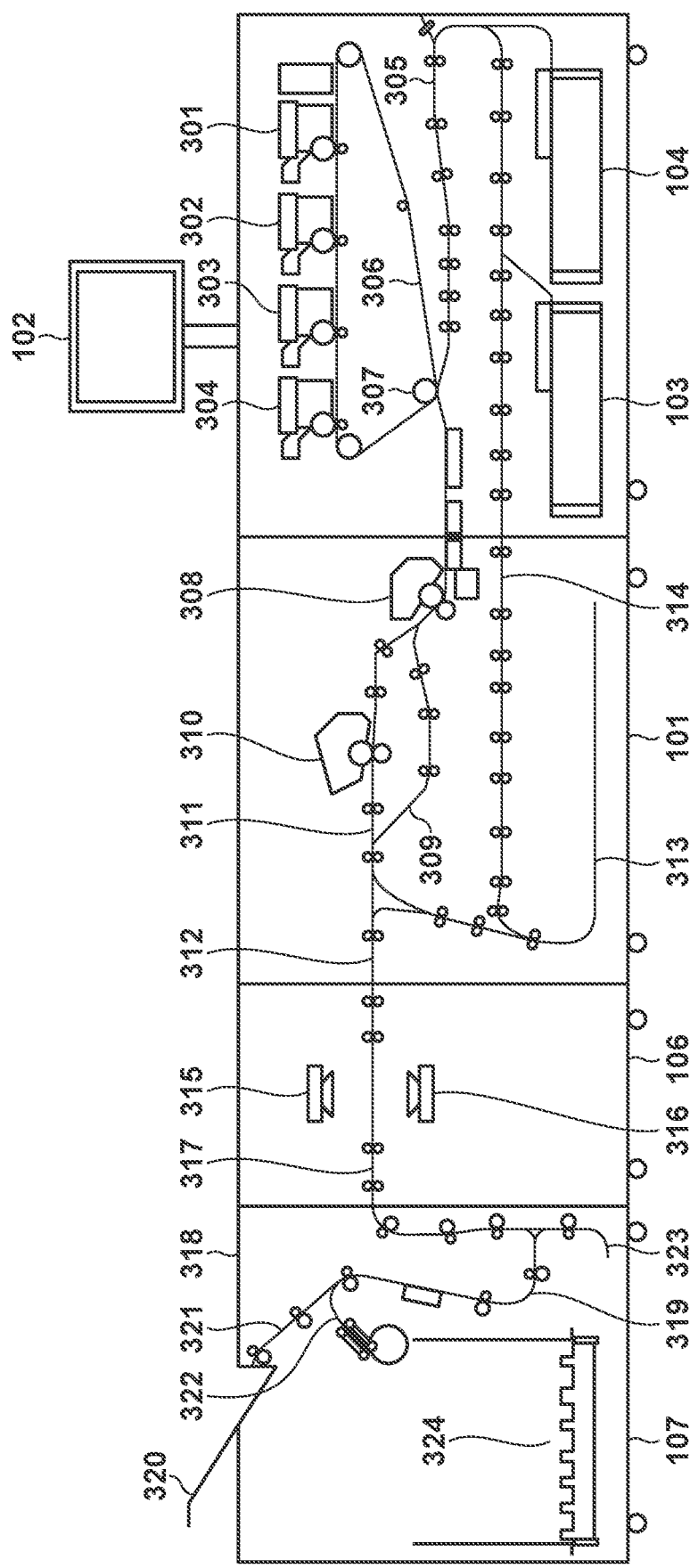
FIG. 3 is a view showing the internal configuration of the information processing apparatus, the inspection apparatus, the printing apparatus, and a large capacity stacker according to the embodiment.

FIG. 3 is a view showing the internal configuration of the printing apparatus 101, the inspection unit 106, and the large capacity stacker 107. The printing apparatus 101 accepts a user input via the UI panel 102 or displays the state of printing or a device. Various kinds of paper sheets can be stored in the paper feed decks 103 and 104. Note that a printing paper sheet is not limited to paper and is therefore also called a sheet, but a paper sheet in this specification is a name including a material other than paper. In each paper feed deck, only the uppermost one of the stored paper sheets can be separated and conveyed to a paper sheet conveyance path 305. To form a color image, development stations 301 to 304 form toner images using color toners of Y, M, C, and K, respectively. The toner image formed here is primarily transferred to an intermediate transfer belt 306. The intermediate transfer belt 306 rotates clockwise in FIG. 3, and the toner image is transferred, at a secondary transfer position 307, to the paper sheet conveyed from the paper sheet conveyance path 305.

A fixing unit 308 includes a pressurizing roller and a heating roller. When the paper sheet passes between the rollers, the toner is melted and press-bonded, thereby fixing the toner image on the paper sheet. The paper sheet that has left the fixing unit 308 is conveyed to an outlet 312 via a paper sheet conveyance path 309. If the paper sheet type requires further melting and press-bonding for fixing, the paper sheet is conveyed to a second fixing unit 310 using an upper paper sheet conveyance path after passing through the fixing unit 308, undergoes additional melting and press-bonding, and is then conveyed to the outlet 312 via a paper sheet conveyance path 311. If the image forming mode is a double-sided mode, the paper sheet is conveyed to a paper sheet reversing path 313, reversed in the paper sheet reversing path 313, and conveyed to a double-sided conveyance path 314, and image transfer to the second surface is performed at the secondary transfer position 307.

In the inspection unit 106, a CIS 315 and a CIS 316 are arranged facing each other. The CIS 315 is an image sensor configured to read the upper surface of the paper sheet, and the CIS 316 is an image sensor configured to read the lower surface of the paper sheet. The inspection unit 106 scans the paper sheet using the CISs 315 and 316 at a timing when the paper sheet conveyed to a paper sheet conveyance path 317 reaches a predetermined position. The scanned image is transmitted to the inspection apparatus 108 via the inspection apparatus I/F 215 and the inspection unit I/F 231. The CPU 226 of the inspection apparatus 108 determines whether the received image includes a defect, and notifies the inspection unit 106 of the determination result via the inspection unit I/F 231 and the inspection apparatus I/F 215. The CPU 216 of the inspection unit 106 notifies the large capacity stacker 107 of the received determination result via the accessory I/Fs 214 and 220.

The large capacity stacker 107 can stack a large capacity of paper sheets. The large capacity stacker 107 includes a main tray 324 as a tray on which paper sheets are stacked. The paper sheet that has passed through the inspection unit 106 enters the large capacity stacker 107 via a paper sheet conveyance path 319. From the paper sheet conveyance path 319, the paper sheet is stacked on the main tray 324 via a paper sheet conveyance path 322. Also, the large capacity stacker 107 includes a top tray 320 as a discharge tray. The CPU 221 of the large capacity stacker 107 controls the conveyance path, thereby discharging paper sheets in which defects are detected by the inspection apparatus 108 and excess tab paper sheets (also called remaining tabs) to the top tray 320. To output a paper sheet to the top tray 320, the paper sheet is conveyed from the paper sheet conveyance path 319 to the top tray 320 via a paper sheet conveyance path 321.

Note that a tab paper sheet is sometimes called a sheet with a tab. More generally, a tab paper sheet is sometime called a cyclic paper sheet (cyclic sheet). The cyclic sheet is not limited to a sheet with a tab. In the cyclic sheets, a plurality of different sheets in a predetermined order form a set of sheets. In a print job, cyclic sheets are used in accordance with the order. If a set of sheets is insufficient for one copy, a new set of sheets can be used.

To stack a paper sheet on the main tray 324, a reversing portion 323 configured to reverse the sheet is used. When stacking a paper sheet on the main tray 324, the paper sheet is reversed once by the reversing portion 323 such that the direction of the paper sheet that enters becomes the same as the direction of the paper sheet upon stacking. When conveying a paper sheet to the top tray 320, the sheet is directly discharged without being flipped at the time of stacking. Hence, the reversing operation in the reversing portion 323 is not performed.

Registration Operation of Reference Image

Figure 4:
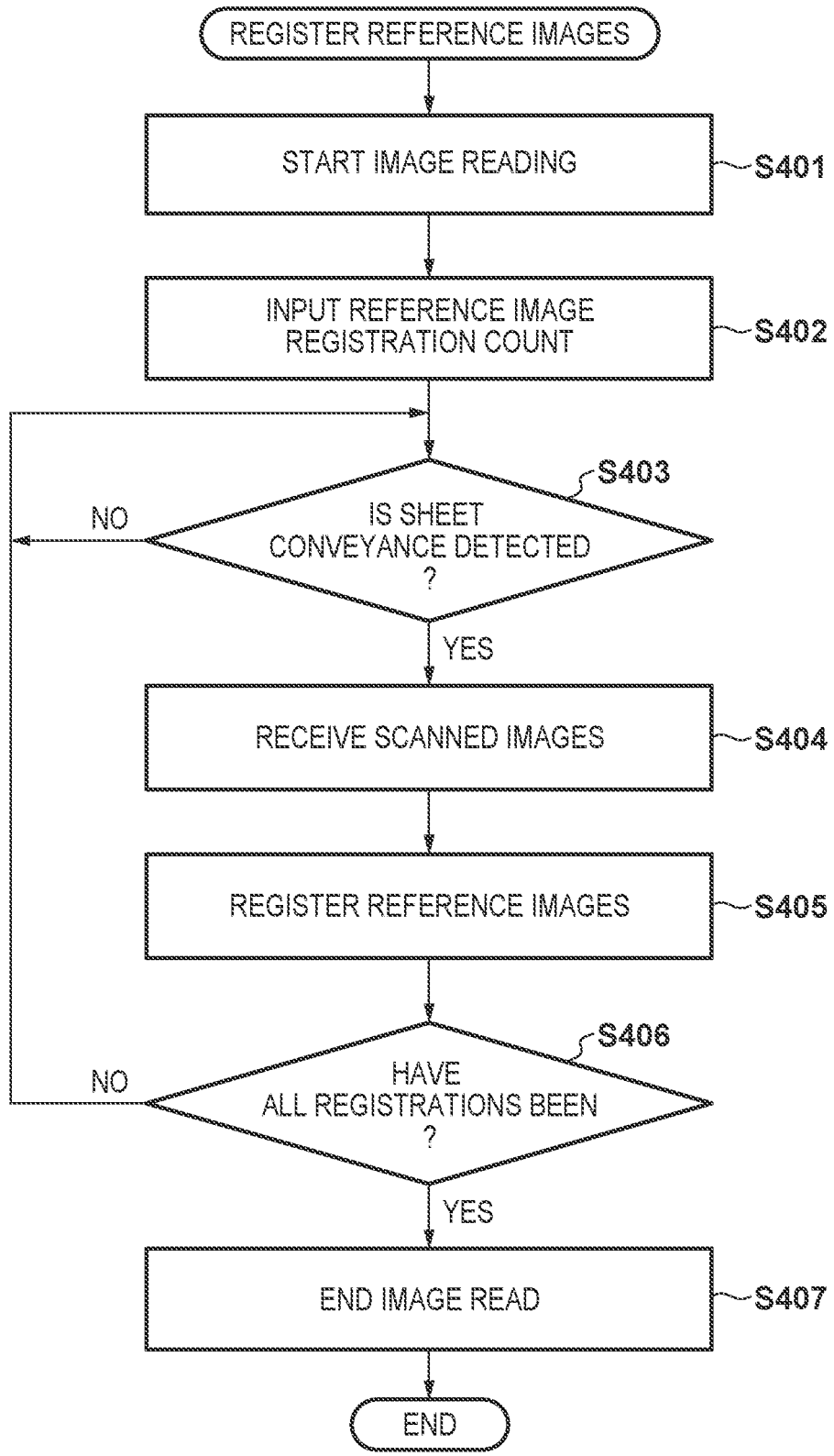
FIG. 4 is a flowchart showing the basic operation of the inspection apparatus at the time of reference image registration according to the embodiment.

FIG. 4 is an operation flowchart showing the basic operation of the inspection apparatus 108 when registering a reference image for inspection.

In step S401, the CPU 226 of the inspection apparatus 108 accepts, via the display unit 245, an image read start instruction from a user. Next, the process advances to step S402 to accept, via the display unit 245, an input of a reference image registration count from the user. Next, the process advances to step S403, and the inspection apparatus 108 discriminates whether a notification representing that an inspection target sheet is conveyed from the inspection unit 106 is received via the inspection unit I/F 231 and the inspection apparatus I/F 215. If the notification is received, the process advances to step S404.

In step S404, the inspection apparatus 108 receives images scanned by the CIS 315 and the CIS 316 from the inspection unit 106 via the inspection unit I/F 231 and the inspection apparatus I/F 215.

Next, in step S405, the CPU 226 of the inspection apparatus 108 registers the images received in step S403 as reference images in the RAM 227. Note that the images of two surfaces are received per sheet and registered. Each of the reference images to be registered is associated with pieces of information representing a paper sheet number of the image and to which one of the obverse and reverse surfaces the image belongs. Also, identification information for specifying the reference image may be associated. Steps S403 to S405 are repeated until the registration of the reference image registration count input in step S402 is ended. If the registration of the reference image registration count is ended, the process advances to step S407, and the CPU 226 ends the image read processing.

Basic Operation by Inspection Apparatus

Figure 5:
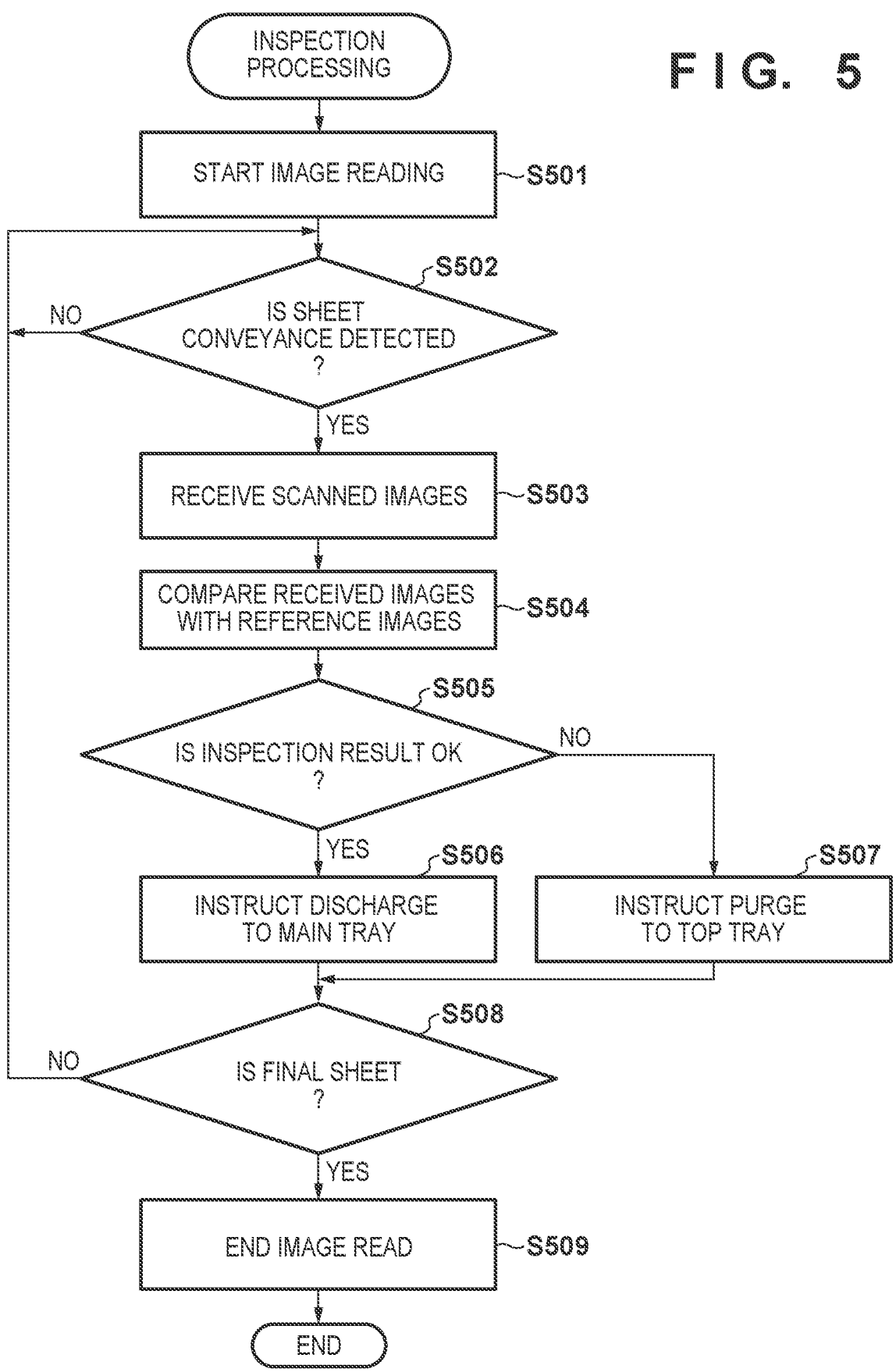
FIG. 5 is a flowchart showing the basic operation of the inspection apparatus according to the embodiment.

FIG. 5 is an operation flowchart showing the basic operation of the inspection apparatus 108 at the time of inspection. In step S501, the CPU 226 of the inspection apparatus 108 accepts, via the display unit 245, an image read start instruction from the user. Next, the process advances to step S502, and the inspection apparatus 108 discriminates whether a notification representing that an inspection target sheet is conveyed from the inspection unit 106 is received via the inspection unit I/F 231 and the inspection apparatus I/F 215. If the notification is received, the process advances to step S503.

In step S503, the inspection apparatus 108 receives, via the inspection unit I/F 231 and the inspection apparatus I/F 215, images obtained by scanning the both surfaces of a sheet by the CIS 315 and the CIS 316. Next, in step S504, the CPU 226 of the inspection apparatus 108 compares the reference images stored in the RAM 227 with the inspection target scan images received in step S503. The reference images are registered in advance in accordance with the procedure described with reference to FIG. 4 before the start of this procedure and stored in the RAM 227. In this comparison operation, first, using the characteristic points of the images as reference points for alignment, the image positions of each reference image and a corresponding inspection target scan image are aligned. Next, in the inspection target scan image, the four corners of the paper sheet and the alignment reference points of the scan image are analyzed, thereby detecting whether a position deviation of the image with respect to the paper sheet exists. Next, the density value of the reference image and that of the inspection target scan image are compared on a pixel basis. If a deviation more than an allowable value, that is, a defect is not detected as a result, the inspection result is OK, that is, the inspection target image is determined as a non-defective product.

Figure 6:
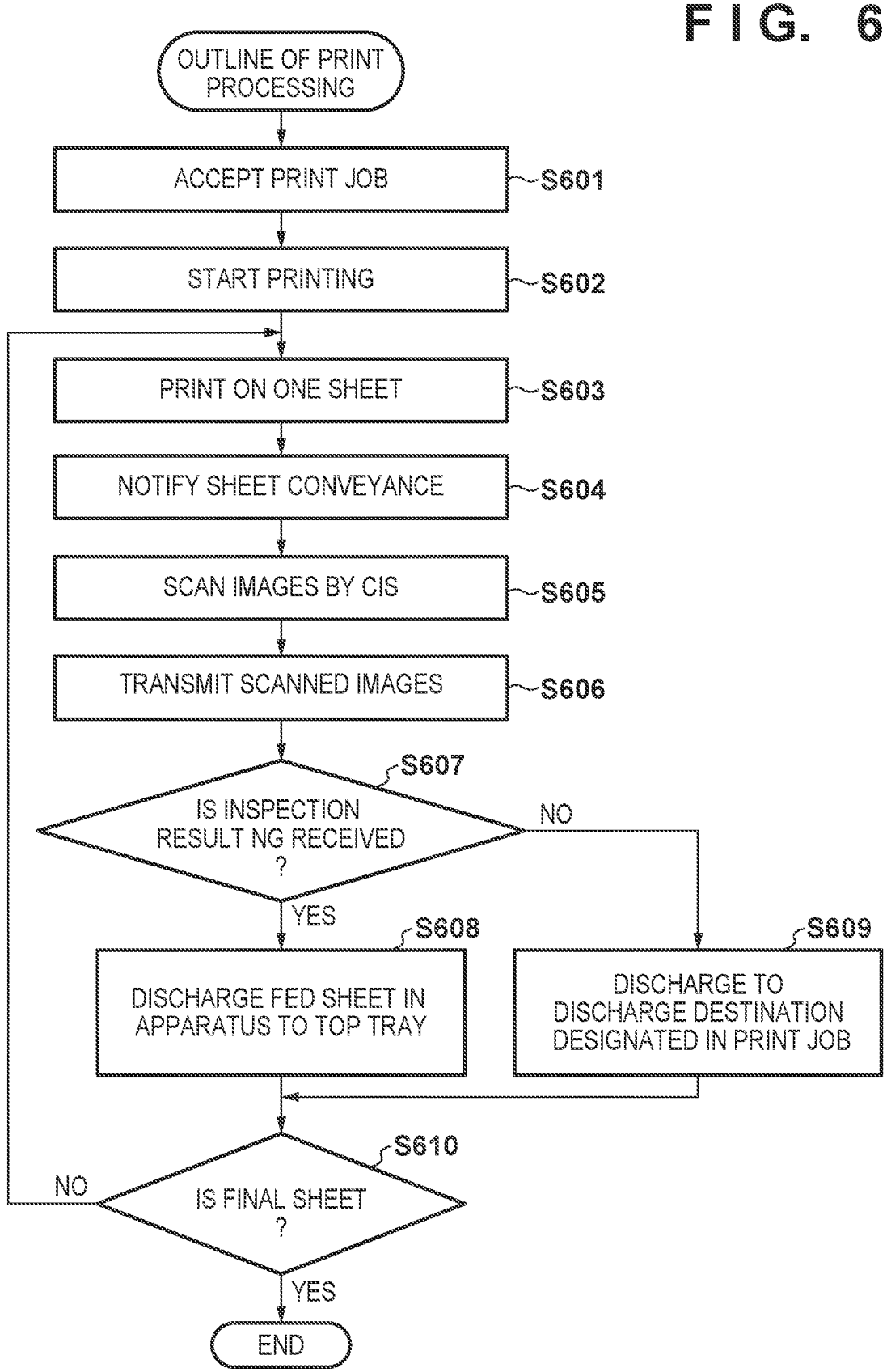
FIG. 6 is a flowchart showing the basic operations of the printing apparatus and an inspection unit at the time of inspection execution according to the embodiment.

In step S505, if the inspection result is OK, the process advances to step S506. In step S506, the inspection apparatus 108 transmits the inspection result OK to the inspection unit 106 via the inspection unit I/F 231 and the inspection apparatus I/F 215. According to this, the inspection unit 106 instructs the large capacity stacker 107 to discharge the sheet to the main tray 324, as shown in FIG. 6. In step S508, it is determined whether the sheet is the final sheet. Steps S502 to S508 are repeated until the inspection of the final sheet is ended. If the inspection of the final sheet is ended, the process advances to step S509, and the CPU 226 of the inspection apparatus 108 accepts, via the display unit 245, an image read end instruction from the user.

If it is determined in step S505 that the inspection result is NG, that is, a defective product, the process advances to step S507. In step S507, the inspection apparatus 108 transmits the inspection result NG to the inspection unit 106 via the inspection unit I/F 231 and the inspection apparatus I/F 215. According to this, the inspection unit 106 instructs the large capacity stacker 107 to discharge (purge) the sheet to the tray for NG, that is, the top tray 320, as shown in FIG. 6. Then, steps S502 to S508 are repeated until the inspection of the final sheet is ended. From then on, the processing can be ended as in the case of the inspection result OK described above.

FIG. 5 shows the outline, and a detailed description of the operation at the time of printing according to this embodiment will be made with reference to FIGS. 6 to 11.

Operations of Printing Apparatus and Inspection Unit Upon Inspection

FIG. 6 is a flowchart of the operations of the printing apparatus 101 and the inspection unit 106 upon inspection. In step S601, the printing apparatus 101 accepts a print job from the information processing apparatus 109 under the control of the CPU 201.

The process advances to step S602, and the CPU 201 starts printing. Next, the process advances to step S603, and the CPU 201 prints an image on a paper sheet (one sheet). The process advances to step S604, and the inspection unit 106 notifies the inspection apparatus I/F 231 via the inspection unit I/F that the inspection target sheet is conveyed to the inspection apparatus 108. Next, in step S605, the inspection unit 106 scans, by the CIS 315 and the CIS 316, the images printed on the conveyed paper sheet. Next, the process advances to step S606, and the inspection unit 106 transmits the images scanned in step S605 to the inspection apparatus 108 via the inspection apparatus I/F 215 and the inspection unit I/F 231.

If the inspection unit 106 receives an inspection result NG from the inspection apparatus 108 via the inspection apparatus I/F 215 and the inspection unit I/F 231 in step S607, the process advances to step S608. In step S608, the CPU 216 of the inspection unit 106 instructs, via the accessory I/Fs 214 and 220, the large capacity stacker 107 to discharge the paper sheet of the inspection result NG to the tray for NG, for example, the top tray 320.

If the inspection unit 106 does not receive an inspection result NG via the inspection apparatus I/F 215 in step S607, the process advances to step S609. In step S609, the CPU 216 of the inspection unit 106 instructs, via the accessory I/Fs 214 and 220, the large capacity stacker 107 to discharge the paper sheet to a discharge destination designated in the print job. After that, the process advances to step S610, and steps S603 to S610 are repeated until the inspection of the final sheet is ended. If the inspection of all sheets is ended, printing is also ended, and therefore, the procedure is ended.

Setting of Tab Paper Sheet

A remaining tab discharge function that is executed by only the printing apparatus 101 according to the present invention will be described next. The remaining tab discharge function is a function of discharging a tab paper sheet that is not inserted into a print job (not used in a print job)

to the outside of the apparatus such that tab paper sheets can correctly be inserted from the first tab paper sheet into the printed product of the next copy. This is because tab paper sheets are provided as a set of a plurality of tab paper sheets whose tab positions are shifted from each other. When generating printed products of a plurality of copies, the positions of tab paper sheets need to match between a plurality of booklets that are products. Hence, when a predetermined number of sheets are used from the start of a set of tab paper sheets, tab paper sheets that are not used in the set of tab paper sheets are discharged, and a new set of tab paper sheets is used from the start for the next booklet.

Figure 7:
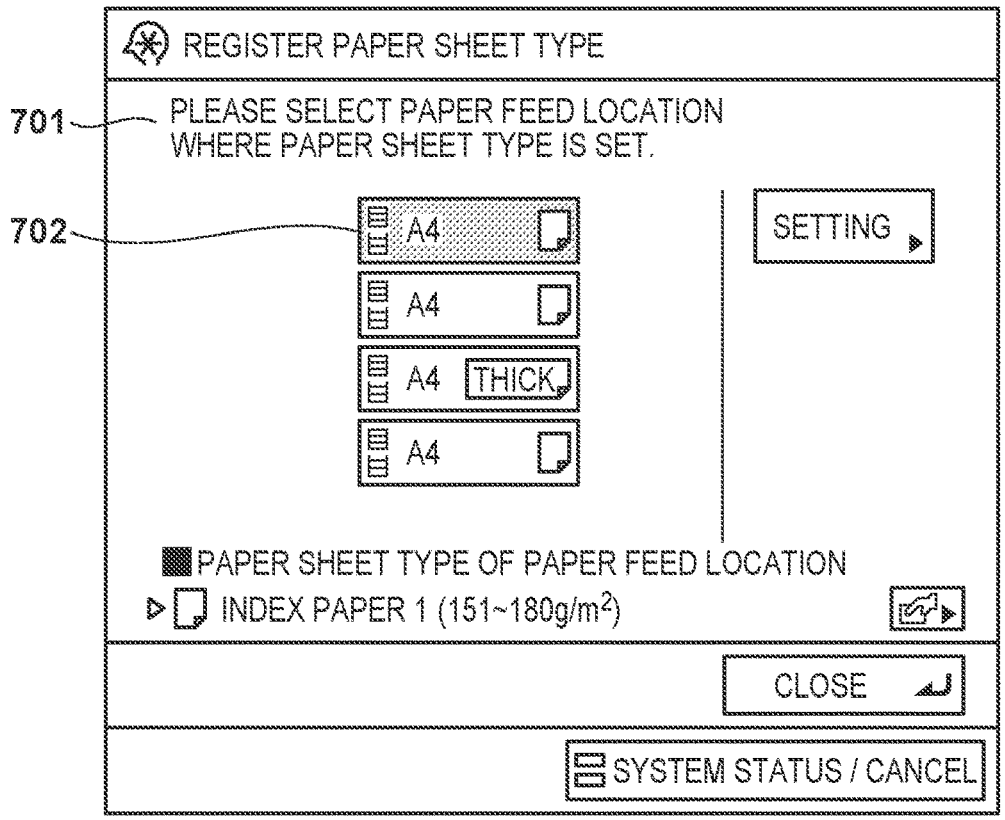
FIG. 7 is a view showing a setting screen for a paper sheet type to be set for a paper feed deck, which is displayed on a UI panel according to the embodiment.
Figure 8:
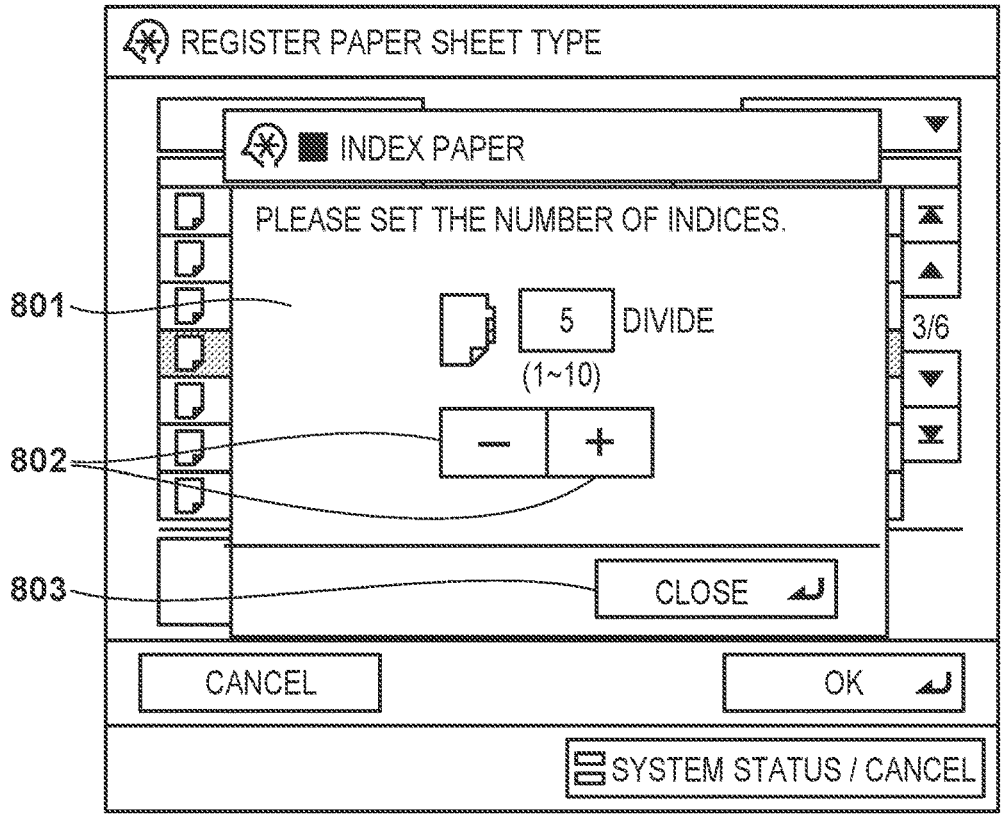
FIG. 8 is a view showing a tab sheet index count setting screen displayed on the UI panel according to the embodiment.

FIG. 7 shows a setting screen 701 for a paper sheet type to be set for a paper feed deck, which is displayed on the UI panel 102. When a paper feed deck 702 is designated, and "tab paper sheet" is selected as a paper sheet type to be set, a screen 801 configured to select the number of indices of tab paper sheets is displayed (FIG. 8).

Here, the number of indices (the number of tabs) of tab paper sheets is information used to calculate the number of remaining tab paper sheets (remaining tabs) when performing remaining tab discharge. For example, "5" is preset as a default value. When the user operates plus and minus keys 802 formed from two keys included in the screen 801, the value can be changed within the range of, for example, 1 to 10. If the number of tab paper sheets to be used in a text is 3 in a state in which, for example, "5" is set in the setting shown in FIG. 8, 5−3=2 is calculated as the number of tab paper sheets to be automatically discharged by remaining tab discharge. A close button 803 is a setting button, and the setting is registered when this button is pressed. A means for setting the number of tabs of tab paper sheets set in the paper feed deck has been described above.

Print Processing Including Tab Paper Sheets (Excluding Remaining Tab Paper Sheets from Inspection)

Figure 9A:
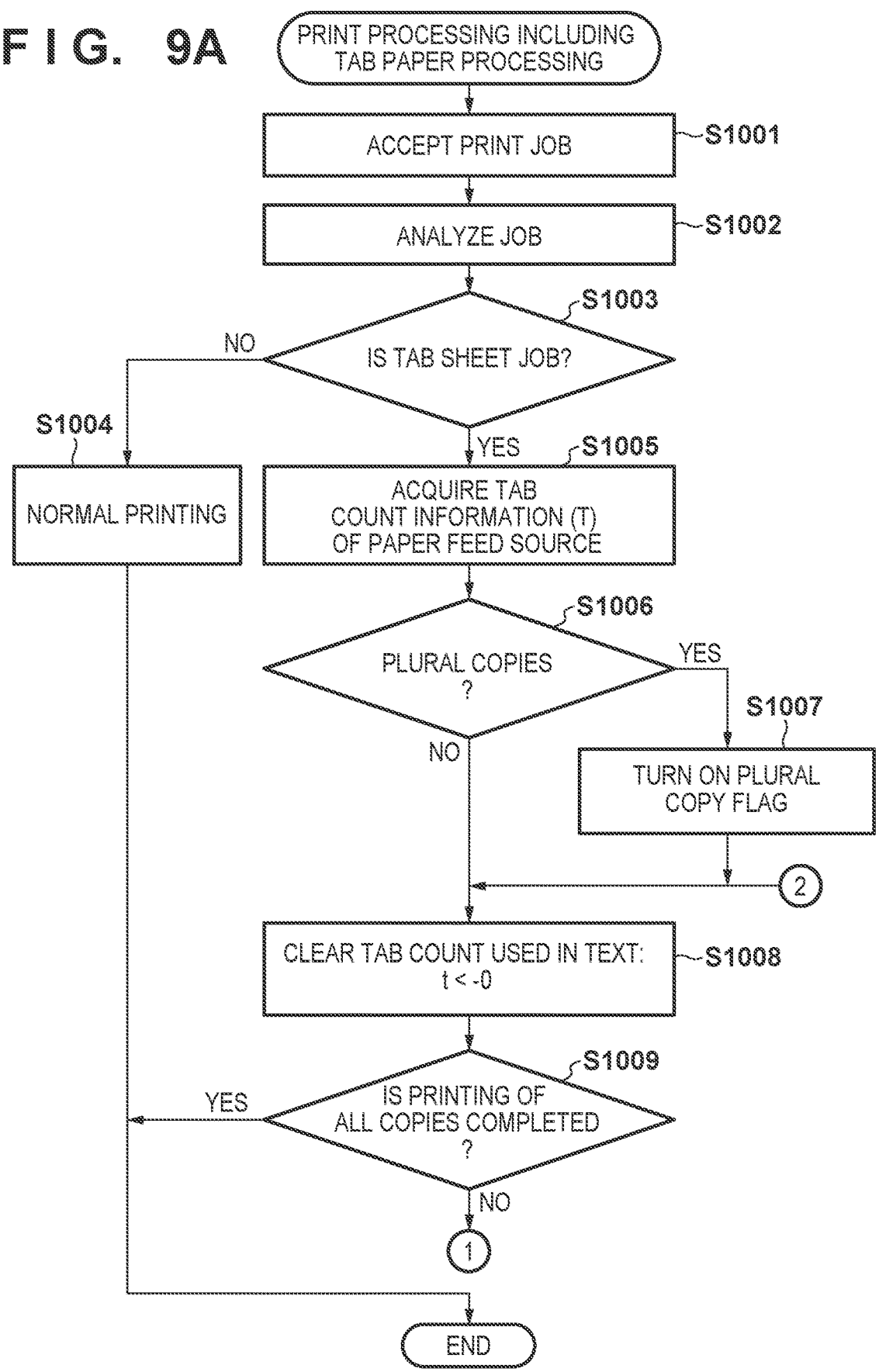
FIGS. 9A, 9B and 10 are flowcharts showing the basic operation of the remaining tab discharge function of the printing apparatus according to the embodiment.
Figure 9B:
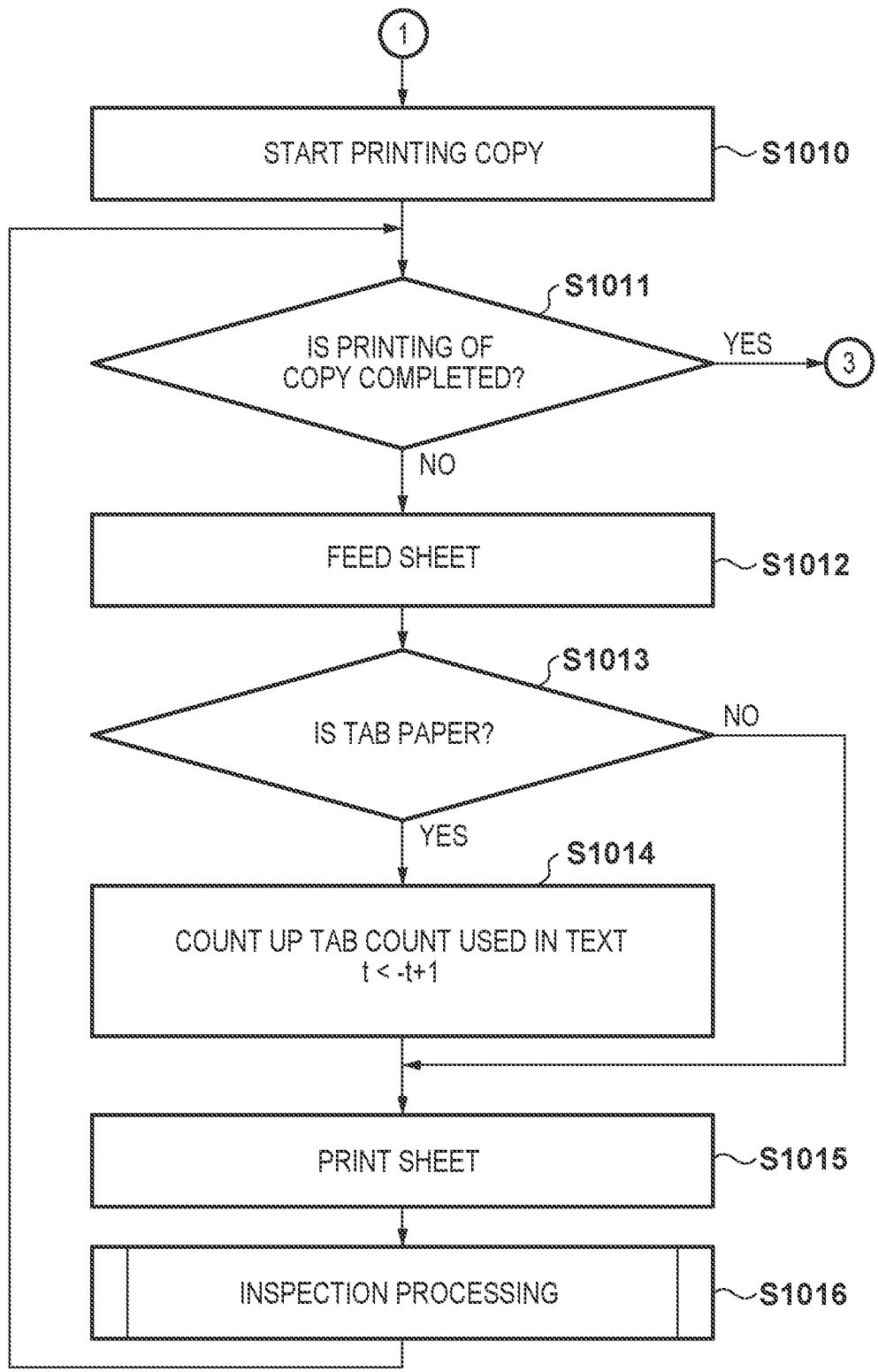
Figure 10:
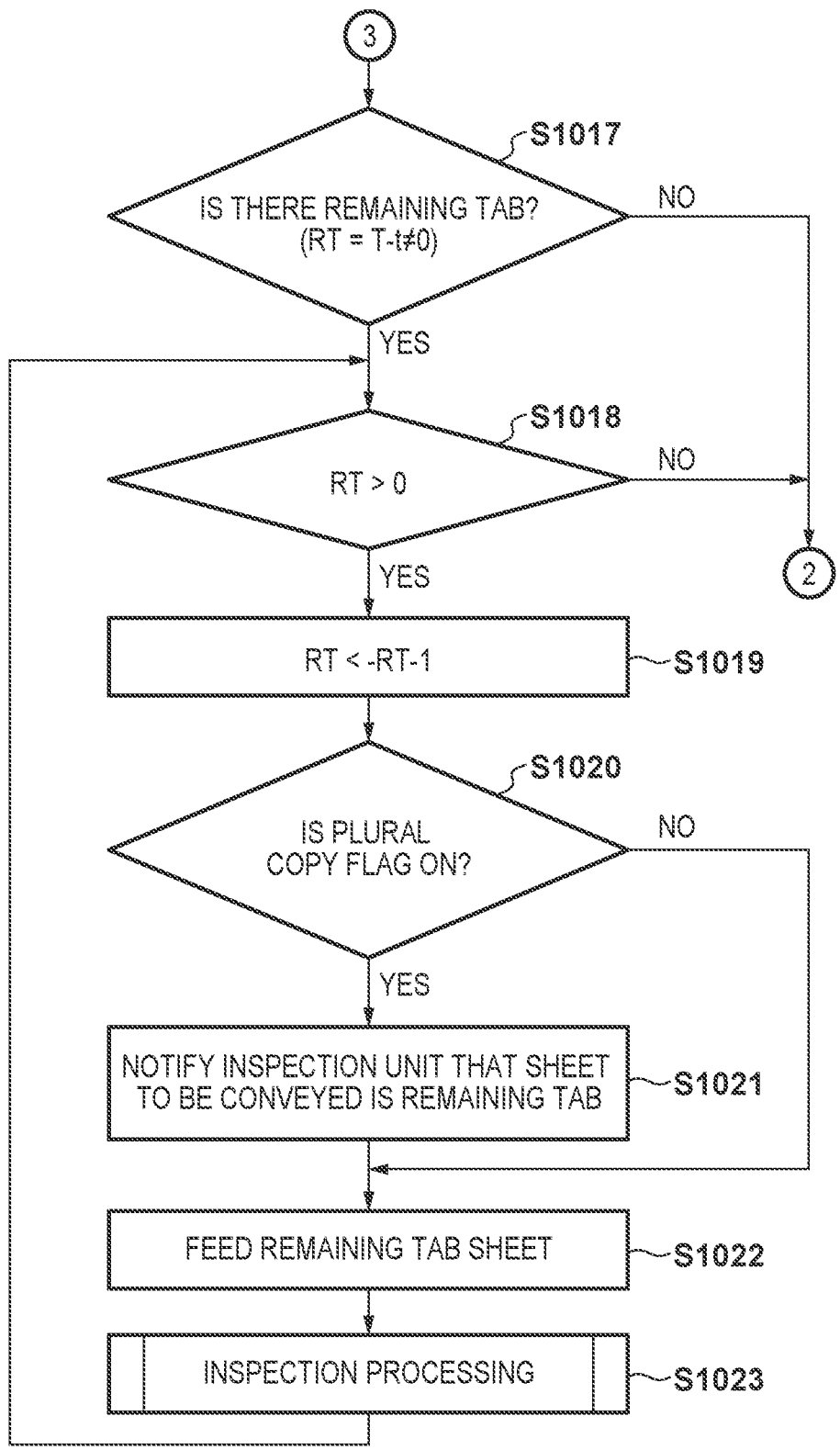

An embodiment for excluding only remaining tabs from the inspection target at the time of inspecting a job for a plurality of copies including tab paper sheets will be described next. FIGS. 9A, 9B and 10 are views divisionally showing the operation flowchart of the printing apparatus 101. This procedure includes control for excluding remaining tab paper sheets from the inspection target, in addition to the basic printing operation.

In step S1001, the printing apparatus 101 accepts a print job that is an inspection target from the information processing apparatus 109 under the control of the CPU 201 of the printing apparatus 101. The process then advances to step S1002, and the CPU 201 analyzes the print job. Next, the process advances to step S1003, and the CPU 201 discriminates whether the print job uses tab paper sheets. Upon determining in step S1003 that the print job does not include tab paper sheets, the process advances to step S1004, and the CPU 201 performs normal printing. In the normal printing, all printed sheets are included in the inspection target, and the quality of each formed image is inspected. In this case, a defective product is discharged to the top tray of the large capacity stacker 107, and a non-defective product is discharged to the main tray. The procedure of step S1004 corresponds to processing from step S602 in FIG. 6.

On the other hand, upon determining in step S1003 that the print job includes tab paper sheets, the process advances to step S1005. In step S1005, the CPU 201 of the printing apparatus 101 acquires tab count information T representing the number of tab paper sheets of one set, which is set for the paper feed deck on the UI shown in FIG. 8. Next, the process advances to step S1006, and the CPU 201 discriminates whether the processing target print job is a print job for outputting printed products of a plurality of copies. Upon determining that the print job is a print job for outputting printed products of a plurality of copies, in step S1007, the CPU 201 turns on a plural copy flag representing that the print job outputs a plurality of copies.

Next, the process advances to step S1008, and the CPU 201 clears tab paper sheet count information t representing the number of tab paper sheets to be used in, for example, a text to 0 for the processing target print job. In step S1009, the CPU 201 discriminates whether printing of all copies of the print job is completed. If printing of all copies is completed, the processing of the print job is completed. On the other hand, if printing of all copies is not completed, the process advances to step S1010 to start printing the next copy (also called a booklet). Initially, the next copy is the booklet of the first copy. Next, in step S1011, the CPU 201 discriminates whether printing of one copy (booklet) of the print job is completed. If printing of one copy is not completed, in step S1012, a sheet is fed under the control of the CPU 201. The process advances to step S1013 to discriminate whether a tab paper sheet is fed under the control of the CPU 201.

If a tab paper sheet is fed, the process advances to step S1014 to add 1 to the tab paper sheet count information t used in the print job. Then, in step S1015, the sheet is printed under the control of the CPU 201. Next, the process advances to step S1016 to perform inspection processing by the inspection unit 106 to be described later with reference to FIG. 12, and then returns to step S1011. Upon judging in step S1013 that a tab paper sheet is not fed, the process advances to step S1015.

Upon judging in step S1011 that printing of one copy is completed, the process advances to step S1017. In step S1017, it is judged under the control of the CPU 201 whether a remaining tab exists. Here, if tab count information T−tab paper sheet count information t=RT is 0, it is judged that no remaining tab exists. If the value is other than 0, it is judged that a remaining tab exists. Note that for a printed product of one copy, tab paper sheets in a plurality of sets, that is, tab paper sheets more than T may be used. Preparing for such a case, the determination of step S1017 may be done by RT=(tab count information T−tab paper sheet count information t) mod tab count information T. In this case, the value of this equation is the number of remaining tabs. Hence, if this value is 0, it can be determined that no remaining tab exists. Here, mod is an operator for obtaining a remainder, and the remainder to be obtained is a minimum non-negative remainder, that is, a positive value smaller than the number to divide.

If no remaining tab exists, the process returns to step S1008. If a remaining tab exists, the process advances to step S1018, and the CPU 201 discriminates whether the remaining tab count is larger than 0. If the remaining tab count is larger than 0, the process advances to step S1019. On the other hand, if the remaining tab count is equal to or smaller than 0, the process branches to step S1008.

In step S1019, 1 is subtracted from the value of RT. In step S1020, the CPU 201 judges whether the plural copy flag is ON. If the plural copy flag is ON, the process advances to step S1021, and the CPU 201 notifies, via the accessory I/F 208 and the accessory I/F 214, the inspection unit 106 that the sheet to be conveyed is a remaining tab. In step S1022, the tab paper sheet is fed under the control of the CPU 201. Next, the process advances to step S1023. Step S1023 is inspection processing by the inspection unit 106 to be described later with reference to FIGS. 11A and 11B. After that, the process returns to step S1018. If the remaining tab count (RT) is 0 in step S1018, all remaining tab processes are completed, and the process returns to step S1008.

By the loop processing of steps S1018 to S1023, all remaining tabs can be discharged from the paper feed tray, and the inspection unit 106 can be notified that the discharged sheets are tab paper sheets. Note that step S1023 is processing by the inspection unit 106, and is operated independently of the processing shown in FIGS. 9 and 10. However, concerning the remaining tab processing, the inspection unit 106 can know by the notification of step S1021 that a sheet to be conveyed is a tab paper sheet.

Inspection Processing

Figure 11A:
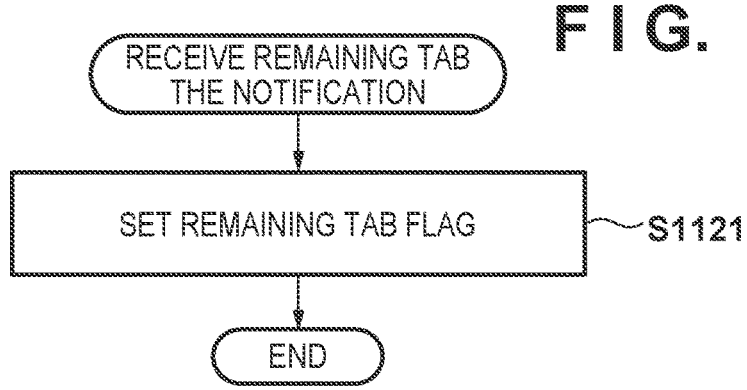
FIGS. 11A and 11B are flowcharts showing the basic operation of an inspection unit according to the first embodiment.
Figure 11B:
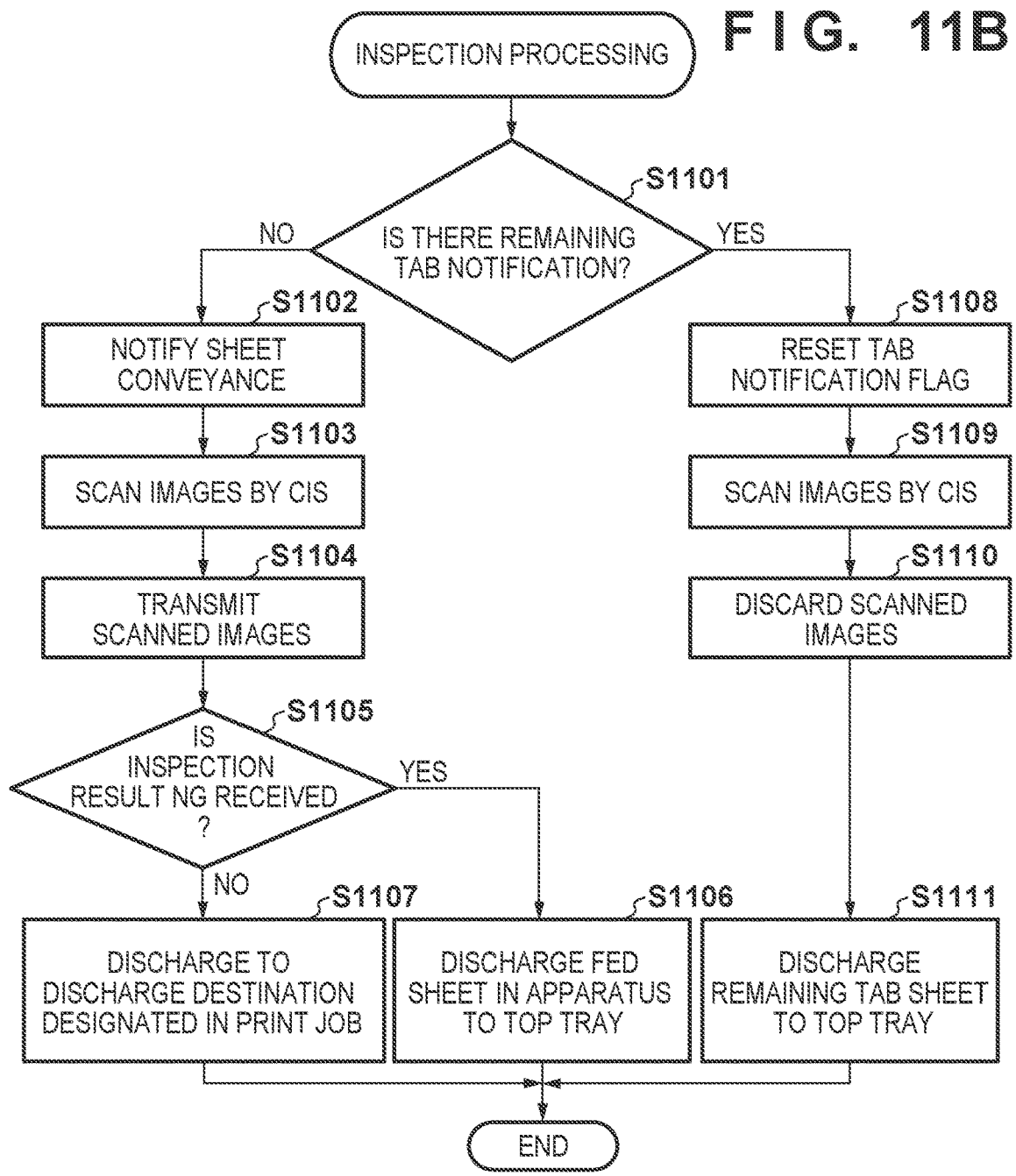

FIGS. 11A and 11B are operation flowcharts showing inspection processing in the inspection unit 106. FIG. 11A shows processing upon receiving the remaining tab notification in step S1021 in FIG. 10. Upon receiving the remaining tab notification, the inspection unit 106 sets a remaining tab notification flag (step S1121). FIG. 11B shows the processing of steps S1016 and S1023 in FIG. 10. This processing is started by the inspection unit 106 when a sheet is conveyed to the inspection unit 106. The sheet conveyance to the inspection unit 106 can be known when, for example, a detection signal from a sheet sensor provided near the outlet 312 is received.

In step S1101, a remaining tab flag is tested, thereby judging whether a remaining tab notification is received. Upon determining that no notification is received, the process advances to step S1102. In step S1102, the inspection unit 106 notifies, via the inspection apparatus I/F 215 and the inspection unit I/F 231, the inspection apparatus 108 that the inspection target sheet is conveyed.

Next, in step S1103, the inspection unit 106 scans images printed on the conveyed paper sheet by the CIS 315 and the CIS 316. Next, the process advances to step S1104, and the inspection unit 106 transmits the images scanned in step S1104 to the inspection apparatus 108 via the inspection apparatus I/F 215 and the inspection unit I/F 231. The inspection unit 106 receives the inspection result of the transmitted images from the inspection apparatus 108, and tests the result in step S1105. In step S1105, if the inspection result that the inspection unit 106 has received from the inspection apparatus 108 is NG, that is, defective, the process advances to step S1106.

In step S1106, the CPU 216 of the inspection unit 106 instructs, via the accessory I/Fs 214 and 220, the large capacity stacker 107 to discharge the sheet of the inspection result NG to the tray for NG, for example, the top tray 320. If the inspection result received by the inspection unit 106 in step S1105 is not NG, that is, non-defective, the process advances to step S1107. In step S1107, the CPU 216 of the inspection unit 106 instructs, via the accessory I/Fs 214 and 220, the large capacity stacker 107 to discharge the paper sheet to a discharge destination designated in the print job.

On the other hand, upon determining in step S1101 that the remaining tab notification is received, the process advances to step S1108. In step S1108, the inspection unit 106 resets the remaining tab flag. Next, in step S1109, the inspection unit 106 scans images printed on the conveyed paper sheet by the CIS 315 and the CIS 316. Next, the process advances to step S1110, and the CPU 216 of the inspection unit 106 discards the scanned images. Next, in step S1111, the CPU 216 instructs, via the accessory I/Fs 214 and 220, the large capacity stacker 107 to discharge the remaining tab paper sheet to the tray for remaining tabs, for example, the top tray 320.

Note that in FIG. 11B, if a setting is done to automatically transmit a paper sheet conveyance notification to the inspection apparatus 108 when the inspection unit 106 detects sheet conveyance, the setting is canceled in, for example, step S1108. After the conveyed sheet is scanned, the setting is done again such that a paper sheet conveyance notification is automatically transmitted.

With the above-described configuration and processing, according to this embodiment, when the printing apparatus 101 discharges a remaining tab, the inspection unit 106 is notified of that. Upon receiving the notification, the inspection unit 106 directly conveys the remaining tab to the stacker without setting it to the inspection target. In the stacker, the remaining tab paper sheet is discharged to a tray different from a tray for non-defective sheets and stacked. Hence, the tab paper sheet used in the print job is set to the inspection target. Also, when a remaining tab is discharged every time printing of a printed product of one copy is completed, tab positions can be aligned between booklets when producing printed products of a plurality of copies.

Note that a plural copy flag is set in steps S1006 and S1007 of FIG. 9A, and the plural copy flag is tested in step S1020 of FIG. 10. However, all these steps may be omitted. Accordingly, even when printing a single copy, remaining tabs are excluded from the inspection target. Even in this case, remaining tab paper sheets are stacked on the tray for these (for example, the top tray).

Second Embodiment

In the first embodiment, the inspection unit switches processing upon receiving a remaining tab notification. In the second embodiment, a configuration for switching processing using discharge destination information for tab paper sheets will be described.

This embodiment will be described with reference to FIG. 12 that is an operation flowchart of a printing apparatus 101 and FIGS. 13A and 13B that are operation flowcharts showing inspection unit processing in an inspection unit 106.

Figure 12:
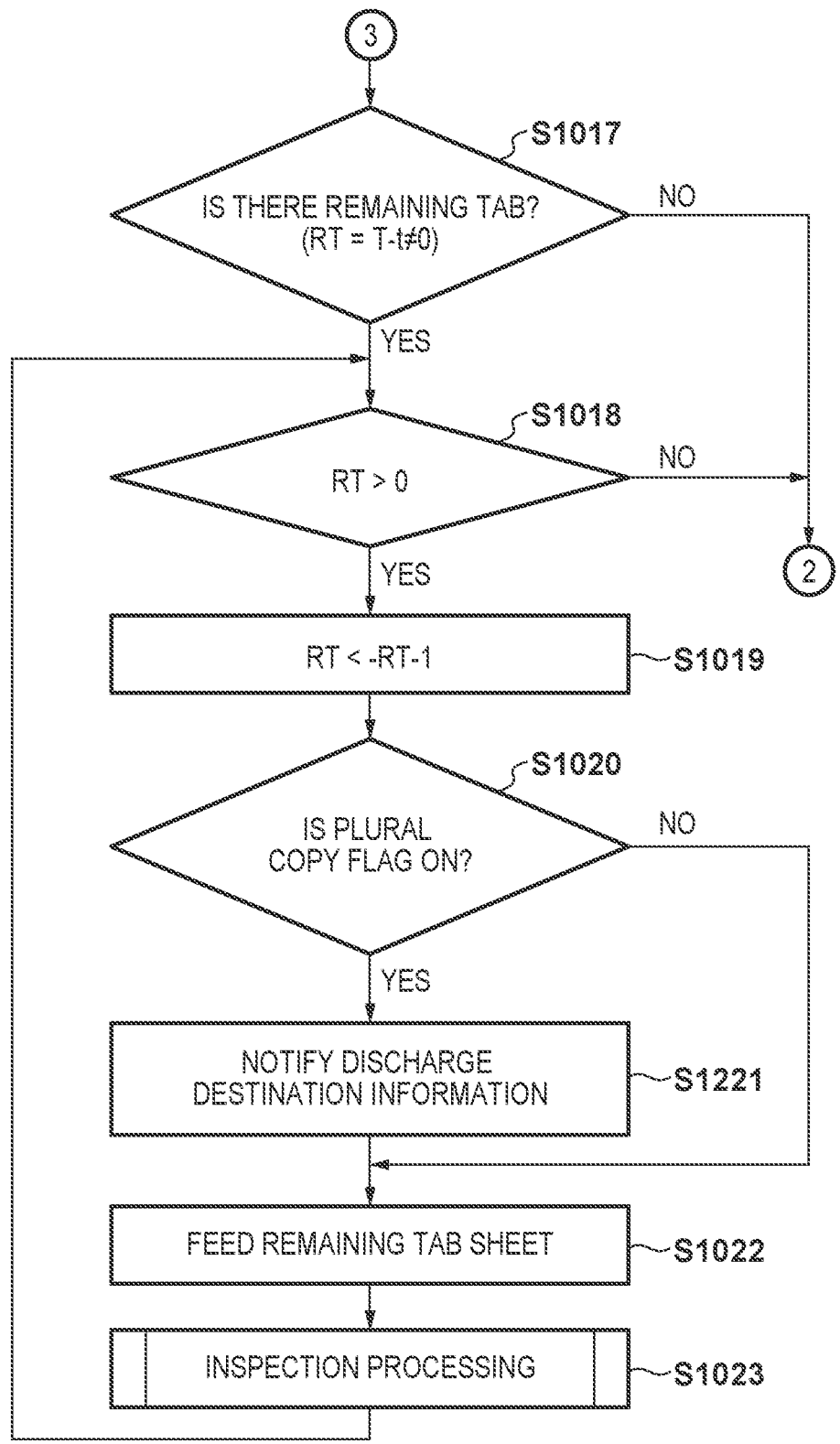
FIG. 12 is a flowchart showing the basic operation of a printing apparatus according to the second embodiment.

The differences between FIGS. 9 and 10 that are the operation flowcharts of the printing apparatus 101 according to the first embodiment and the operation flowcharts of this embodiment are only step S1020 of FIG. 10 and step S1220 of FIG. 12. Hence, the processes shown in FIGS. 9A and 9B are omitted, and FIG. 12 is shown as processes in place of FIG. 10. A description of parts other than the differences from the first embodiment will be omitted here.

Upon determining in step S1020 of FIG. 12 that a plural copy flag is on, in step S1221, a CPU 201 of the printing apparatus 101 notifies, via an accessory I/F 208 and an accessory I/F 214, the inspection unit 106 of discharge destination information for a sheet to be conveyed. The discharge destination information indicates, for example, one of two trays provided in a large capacity stacker 107. In this example, a top tray is designated as the discharge destination of a remaining tab. Note that a tray designated in a print job is the main tray, and a sheet determined as a defective product as the result of inspection is discharged to the top tray. In any case, the discharge destination information notified in step S1221 is preferably different from the discharge destination designated in the print job. The discharge destinations may be the same. In this case, remaining tabs are discharged to the same tray as non-defective printed products.

FIGS. 11A and 11B that are the operation flowcharts of the inspection unit 106 according to the first embodiment are replaced with FIGS. 13A and 13B that are operation flowcharts in this embodiment. FIG. 13A shows processing performed when the discharge destination information in step S1221 of FIG. 12 is received. Upon receiving the discharge destination information, the inspection unit 106 stores it as the setting of the discharge destination designation (step S1321). FIG. 13B shows the processes in step S1016 of FIG. 10 and step S1023 of FIG. 12. This processing is started by the inspection unit 106 when a sheet is conveyed to the inspection unit 106. The sheet conveyance to the inspection unit 106 can be known when, for example, a detection signal from a sheet sensor provided near an outlet 312 is received.

In step S1301, the inspection unit 106 judges whether the discharge destination designation is the discharge destination designated by the print job. Note that the discharge destination designated by the print job may be notified in advance by, for example, a notification from the printing apparatus 101, or may be fixed to the main tray or the like. In any case, the discharge destination designated by the print job is set as the initial setting value of the discharge destination designation. The determination of step S1301 can be implemented by, for example, comparing the current set value of the discharge destination designation with the discharge destination designated by the print job. If the discharge destination designation is the discharge destination designated by the print job in step S1301, the process advances to step S1102. If the discharge destination designation is not the discharge destination, the process advances to step S1308. Processing from step S1102 is the same as in FIG. 11B, and a description thereof will be omitted.

On the other hand, upon determining in step S1301 that the discharge destination designation is different from the discharge destination designated by the print job, the process advances to step S1308. In step S1308, the inspection unit 106 scans images printed on the conveyed paper sheet by a CIS 315 and a CIS 316. Next, the process advances to step S1309, and a CPU 216 of the inspection unit 106 discards the scanned images. Next, in step S1310, the CPU 216 instructs, via accessory I/Fs 214 and 220, the large capacity stacker 107 to discharge the remaining tab paper sheet to the tray corresponding to the discharge destination designation set in FIG. 13A. Finally, in step S1311, the discharge destination designation is returned to the discharge destination designated by the print job.

Note that in FIG. 13B, if a setting is done to automatically transmit a paper sheet conveyance notification to an inspection apparatus 108 when the inspection unit 106 detects sheet conveyance, the setting is canceled in, for example, step S1308. After the conveyed sheet is scanned, the setting is done again such that a paper sheet conveyance notification is automatically transmitted.

With the above-described configuration and processing, according to this embodiment, when the printing apparatus 101 discharges a remaining tab, the inspection unit 106 is notified of the discharge destination of the remaining tab. Upon receiving the notification, the inspection unit 106 directly conveys the remaining tab whose discharge destination is different from the discharge destination of the print job to the stacker without setting it to the inspection target. In the stacker, the remaining tab paper sheet is discharged to the designated tray and stacked. Hence, the tab paper sheet used in the print job is set to the inspection target. Also, when a remaining tab is discharged every time printing of a printed product of one copy is completed, tab positions can be aligned between booklets when producing printed products of a plurality of copies.

Third Embodiment

In the first and second embodiments, the remaining tab discharge function is executed only by the printing apparatus 101. In this embodiment, a configuration using a remaining tab discharge function by an information processing apparatus 109 will be described. The operation of the remaining tab discharge function by the information processing apparatus 109 will be described below. In addition to a text print job including tab paper sheets to be inspected, the information processing apparatus 109 creates another dedicated print job (remaining tab discharge job) for discharging a remaining tab. In the remaining tab discharge job, tab paper sheets are designated as all paper sheets to be used. Next to the print job of the inspection target, the information processing apparatus 109 generates the remaining tab discharge job by designating a discharge destination different from that of the print job of the inspection target and transmits the remaining tab discharge job to a printing apparatus 101, thereby implementing the remaining tab discharge function. In this embodiment, when printing booklets of a plurality of copies, a print job is created for each booklet, and a remaining tab discharge job is created if necessary. These jobs are executed by the printing apparatus 101.

Figure 14A:
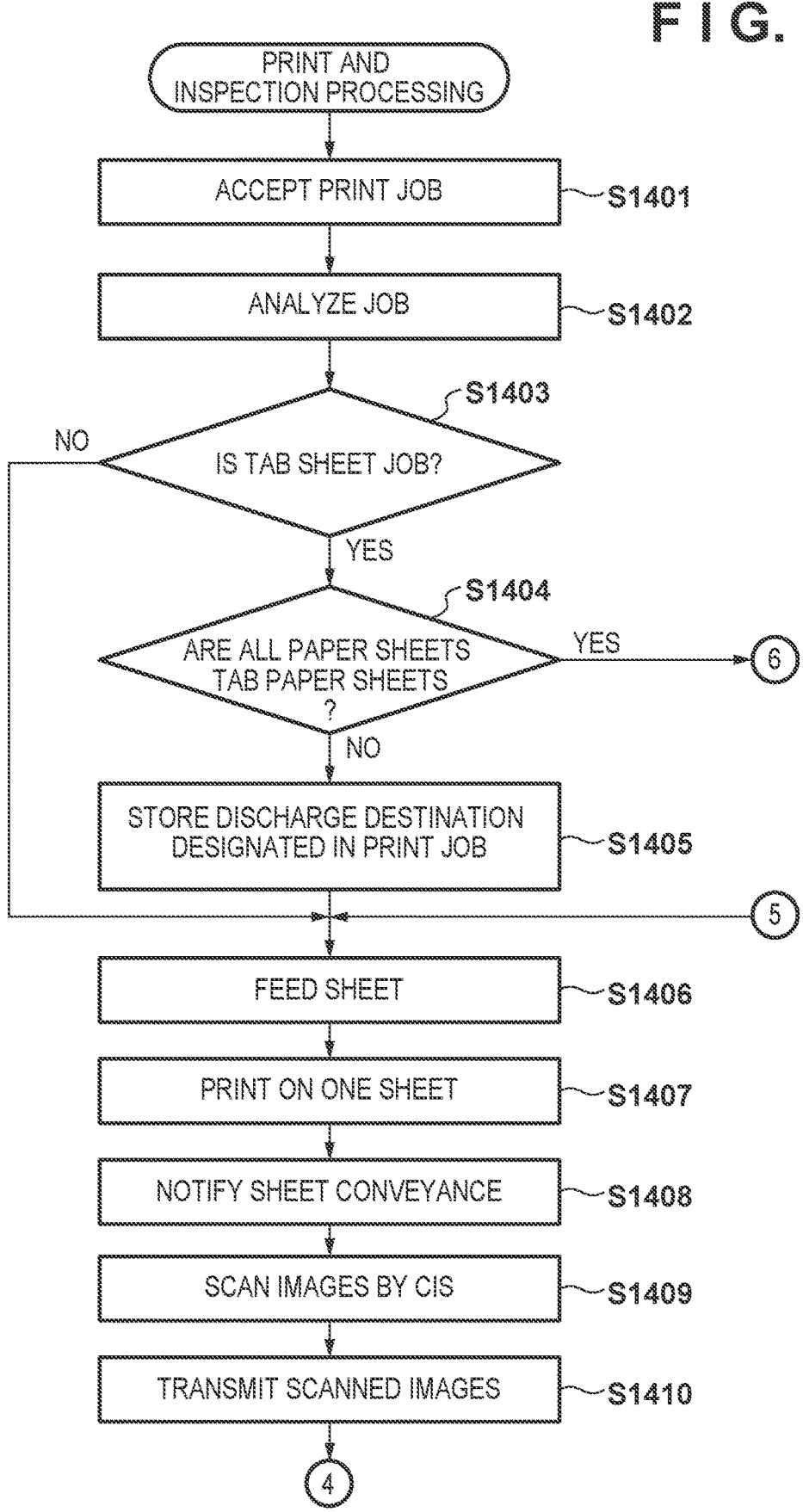
FIGS. 14A and 14B are flowcharts showing the basic operations of a printing apparatus and an inspection unit at the time of inspection execution according to the third embodiment.
Figure 14B:
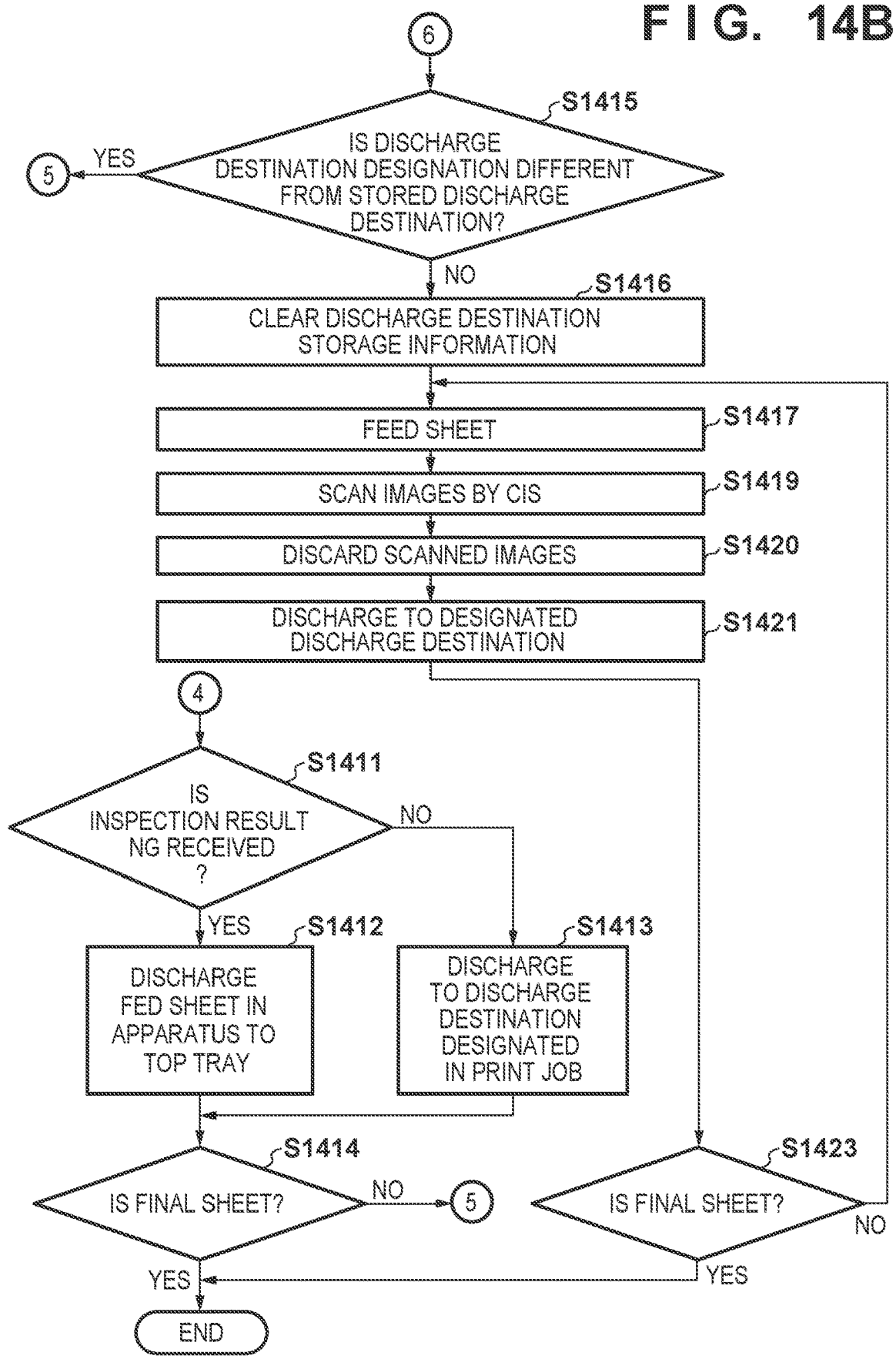

FIGS. 14A and 14B are flowcharts of the operations of the printing apparatus 101 and an inspection unit 106 at the time of inspection in a case in which the remaining tab discharge function by the information processing apparatus 109 is used. Since the processes of the apparatuses are shown as one procedure in FIGS. 14A and 14B without being separated, the main constituent of each process is explicitly shown to indicate which apparatus executes the process.

In step S1401 of FIG. 14A, the printing apparatus 101 accepts a print job under the control of a CPU 201. The process advances to step S1402, and the CPU 201 analyzes the print job. Next, the process advances to step S1403, and the CPU 201 discriminates whether the print job includes a tab paper sheet. If the print job does not include a tab paper sheet, the process advances to step S1406. If the print job includes a tab paper sheet, the process advances to step S1404, and the CPU 201 discriminates whether all paper sheets in the print job are tab paper sheets.

If all paper sheets are tab paper sheets, the process advances to step S1405, and the CPU 201 stores the discharge destination information designated by the print job. Here, the printing apparatus 101 may give an instruction to perform inspection to the inspection unit 106. Note that if inspection is to be executed unless otherwise specified, this instruction may be absent. In step S1406, a sheet is fed under the control of the CPU 201. Next, the process advances to step S1407, and the CPU 201 prints an image on the paper sheet (one sheet). The process advances to step S1408, and the inspection unit 106 notifies, via an inspection apparatus I/F 215 and an inspection unit I/F 231, an inspection apparatus 108 that the inspection target sheet is conveyed.

Next, in step S1409, the inspection unit 106 scans, by a CIS 315 and a CIS 316, the images printed on the conveyed paper sheet. Next, the process advances to step S1410, and the inspection unit 106 transmits the images scanned in step S1409 to the inspection apparatus 108. The inspection apparatus 108 evaluates the received images by comparison with reference images, and transmits the inspection result to the inspection unit 106. In step S1411, it is determined whether the inspection result that the inspection unit 106 has received from the inspection apparatus 108 is NG, that is, defective. If the inspection result is NG, the process advances to step S1412. In step S1412, a CPU 216 of the inspection unit 106 instructs, via accessory I/Fs 214 and 220, a large capacity stacker 107 to discharge the paper sheet of the inspection result NG to the tray for NG, for example, a top tray 320.

If the inspection result received by the inspection unit 106 in step S1411 is not NG, the process advances to step S1413. In step S1413, the CPU 216 of the inspection unit 106 instructs, via the accessory I/Fs 214 and 220, the large capacity stacker 107 to discharge the paper sheet to the discharge destination designated by the print job. After that, the process advances to step S1414, and steps S1406 to S1414 are repeated until the inspection of the final sheet is ended. If the inspection of all sheets is ended, printing is also ended, and therefore, the procedure is ended.

If all paper sheets in the print job are tab paper sheets in step S1404, the process advances to step S1415, and the CPU 201 of the printing apparatus 101 judges whether the discharge destination is different from the discharge destination information stored in step S1405. If all paper sheets are tab paper sheets, and the designated discharge destination is different from that of the immediately preceding print job, the job is identified as a remaining tab discharge job. Hence, if the discharge destination is different from the discharge destination of the immediately preceding print job in step S1415, the job is judged as a remaining tab discharge job, and the process advances to step S1416. In step S1416, the CPU 201 clears the discharge destination information. Also, in step S1416, the printing apparatus 101 may give an instruction not to perform inspection to the inspection unit 106. In step S1417, the designated sheet (that is, a tab paper sheet) is fed under the control of the CPU 201.

In step S1419, the inspection unit 106 that has received the instruction not to perform inspection scans, by the CIS 315 and the CIS 316, the images printed on the conveyed paper sheet. At this time, the inspection unit 106 does not transmit a paper sheet conveyance notification to the inspection apparatus 108. Next, the process advances to step S1420, and the CPU 216 discards the scanned images. Next, in step S1421, the CPU 216 of the inspection unit 106 instructs, via the accessory I/Fs 208 and 214, the large capacity stacker 107 to discharge the paper sheet to the job-designated discharge destination (for example, the top tray 320) of the remaining tab discharge job. After that, the process advances to step S1423, and steps S1417 to S1423 are repeated until the inspection of the final sheet is ended. If the inspection of all sheets is ended, the procedure is ended.

Note that if the instruction not to perform inspection is given to the inspection unit 106 in step S1416, and it is determined in step S1423 that the feeding of all sheets is ended, the printing apparatus 101 may give an instruction to perform inspection to the inspection unit 106. This can set the next print job to the inspection target.

In the above-described way, for a job determined as a remaining tab discharge job, inspection is not performed, and a sheet is discharged to a tray designated for remaining tabs. It is therefore possible to prevent the synchronization between the inspection target sheet and the reference image from being lost, as in the first or second embodiment. In addition, when remaining tab paper sheets are discharged for each print job, tab positions of printed products created by the print jobs can be matched. Furthermore, since a remaining tab discharge job can be designated on a job basis, it is not necessary to notify a remaining tab for each sheet.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-002391, filed Jan. 8, 2021 which is hereby incorporated by reference herein in its entirety.

What is claimed is:

1. An image forming system comprising:
a printer configured to execute a print job and form an image on a sheet; and
an inspection unit configured to receive the sheet discharged from the printer and to inspect a quality of the image formed on the sheet,
wherein the inspection unit inspects at least one tab sheet inserted to a printed product from among a plurality of tab sheets discharged from the printer and does not inspect at least one tab sheet not inserted to the printed product from among the plurality of tab sheets discharged from the printer.

2. The image forming system according to claim 1, further comprising a stacker including a plurality of stacking portions configured to stack the sheet discharged by the inspection unit,
wherein the sheet discharged by the printer without being used for the print job and the sheet used for the print job are stacked on different stacking portions.

3. The image forming system according to claim 2, wherein a sheet on which an image determined as defective by the inspection unit is formed is stacked on the same stacking portion as the sheet discharged by the printer without being used for the print job.

4. The image forming system according to claim 1, wherein in a case where the print job is a print job using the tab sheet, and a remaining tab sheet that is not used in printing of one copy exists in a set of a predetermined number of tab sheets, the inspection unit does not set the remaining tab sheet to be the target of inspection as the sheet discharged by the printer without being used for the print job.

5. The image forming system according to claim 1, wherein the printer notifies the inspection unit that the sheet conveyed to the inspection unit is the sheet discharged by the printer without being used for the print job, and the inspection unit does not set the sheet concerning the notification to be the target of inspection as the sheet discharged by the printer without being used for the print job.

6. The image forming system according to claim 1, wherein the printer notifies the inspection unit of a discharge destination of the sheet conveyed to the inspection unit, and the inspection unit does not set a sheet for which a discharge destination different from the discharge destination designated for the print job is designated to be the target of inspection as the sheet discharged by the printer without being used for the print job.

7. The image forming system according to claim 1, wherein in a case where in the print job to be executed, all sheets to be used are the tab sheets, and a designed discharge destination is different from a discharge destination designated in another print job including, in sheets to be used, a sheet that is not the tab sheet, the printer makes a notification not to set the sheet concerning the print job to be executed to be the target of inspection, and in accordance with the notification, the inspection unit does not set the sheet to be the target of inspection as the sheet concerning the print job.

8. The image forming system according to claim 1, wherein the plurality of tab sheets is an index sheet.

9. The image forming system according to claim 1, further comprising a reader configured to read the image formed on the sheet, wherein the reader reads images on the plurality of tab sheets discharged from the printer, and the inspection unit does inspect an image formed on each of the at least one tab sheet inserted to the printed product from among a plurality of tab sheets on which images have been read, but does not inspect an image formed on each of the at least one tab sheet not inserted to the printed product.

10. The image forming system according to claim 1, wherein the inspection unit inspects the quality of the image formed on the sheet by comparing the image with a reference image.

11. The image forming system according to claim 1, wherein respective positions of tabs of the plurality of tab sheets are different from one another.

12. A non-transitory computer-readable storage medium storing a program, wherein the program is a program configured to cause a computer to control:

a printer configured to execute a print job and form an image on a sheet; and an inspection unit configured to receive the sheet discharged from the printer and to inspect a quality of the image formed on the sheet, wherein the inspection unit inspects at least one tab sheet inserted to a printed product from among a plurality of tab sheets discharged from the printer and does not inspect at least one tab sheet not inserted to the printed product from among the plurality of tab sheets discharged from the printer.

13. A control method of an image forming system, the method including:

executing, by a printer, a print job and forming an image on a sheet; and receiving the sheet discharged from the printer and inspecting a quality of the image formed on the sheet, wherein in the inspecting, at least one tab sheet inserted to a printed product from among a plurality of tab sheets discharged from the printer is inspected, and at least one tab sheet not inserted to the printed product from among the plurality of tab sheets discharged from the printer is not inspected.

* * * * *